FIG. 9 CHAN REQUEST (17)
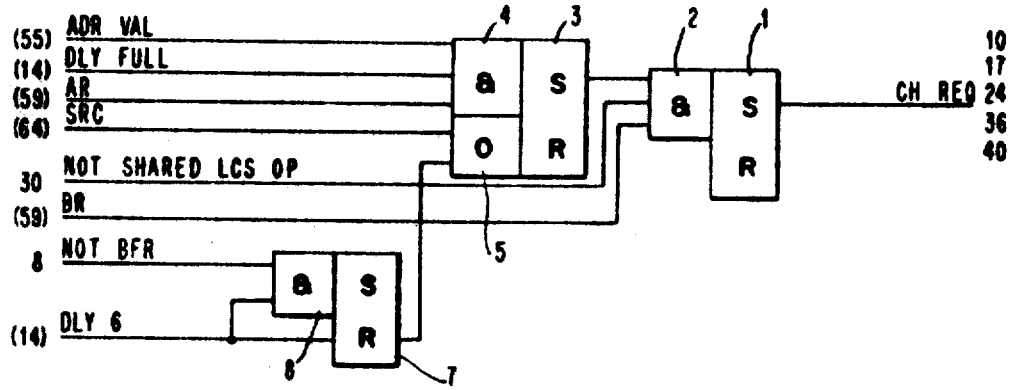
FIG. 10 GATE CH/CPU, CH E/O/LCS, CH/CPU OP (18)
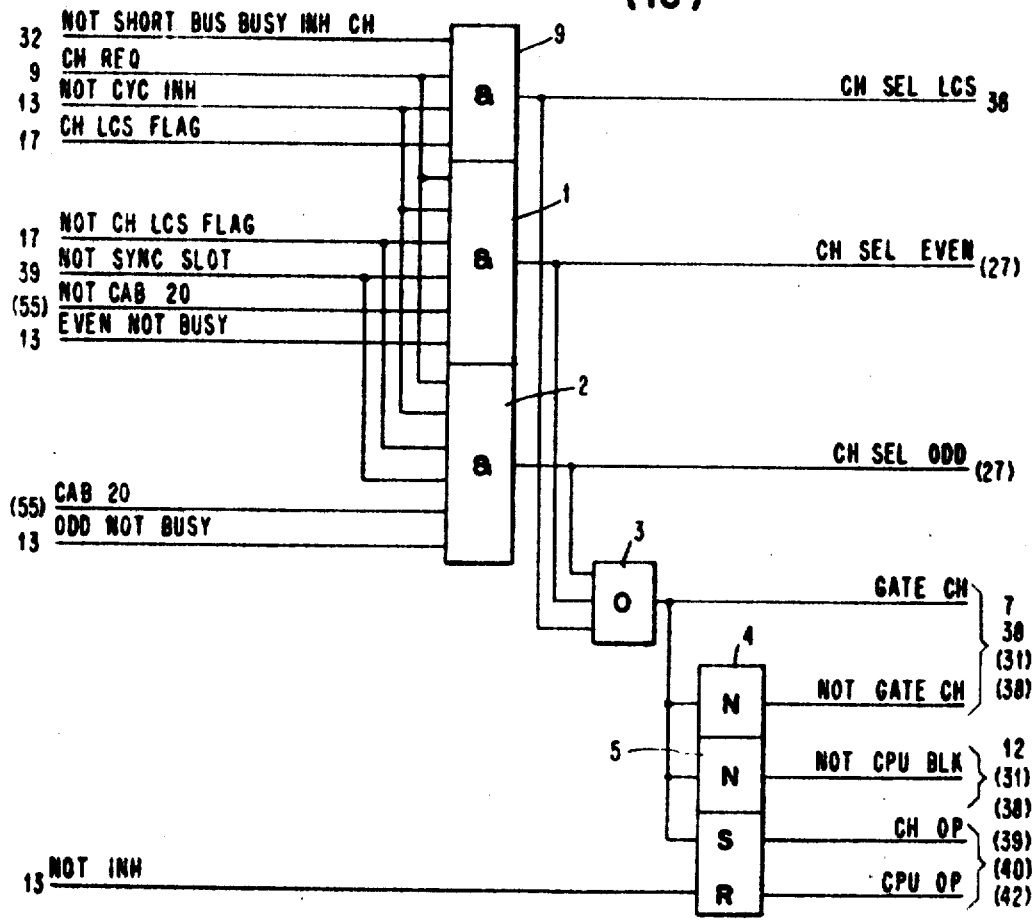

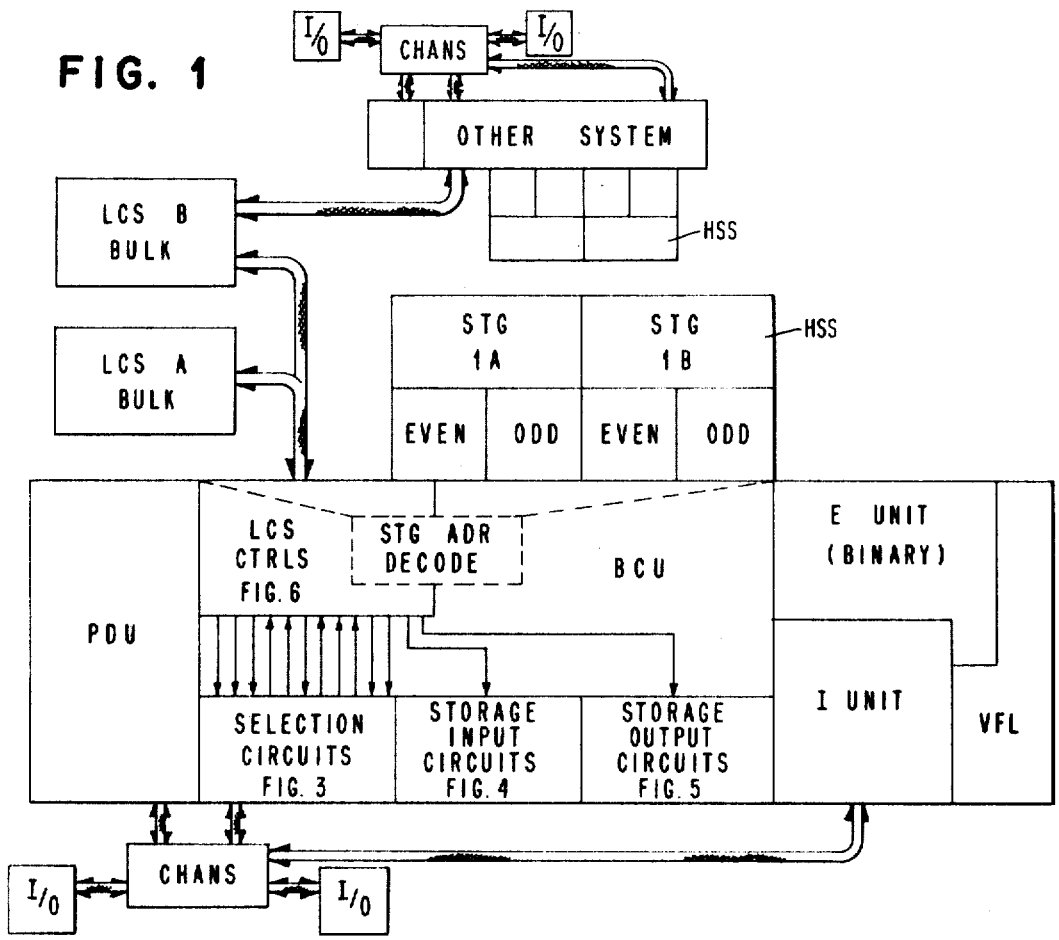
FIG. 1
FIG. 2 SIMPLIFIED TIMING

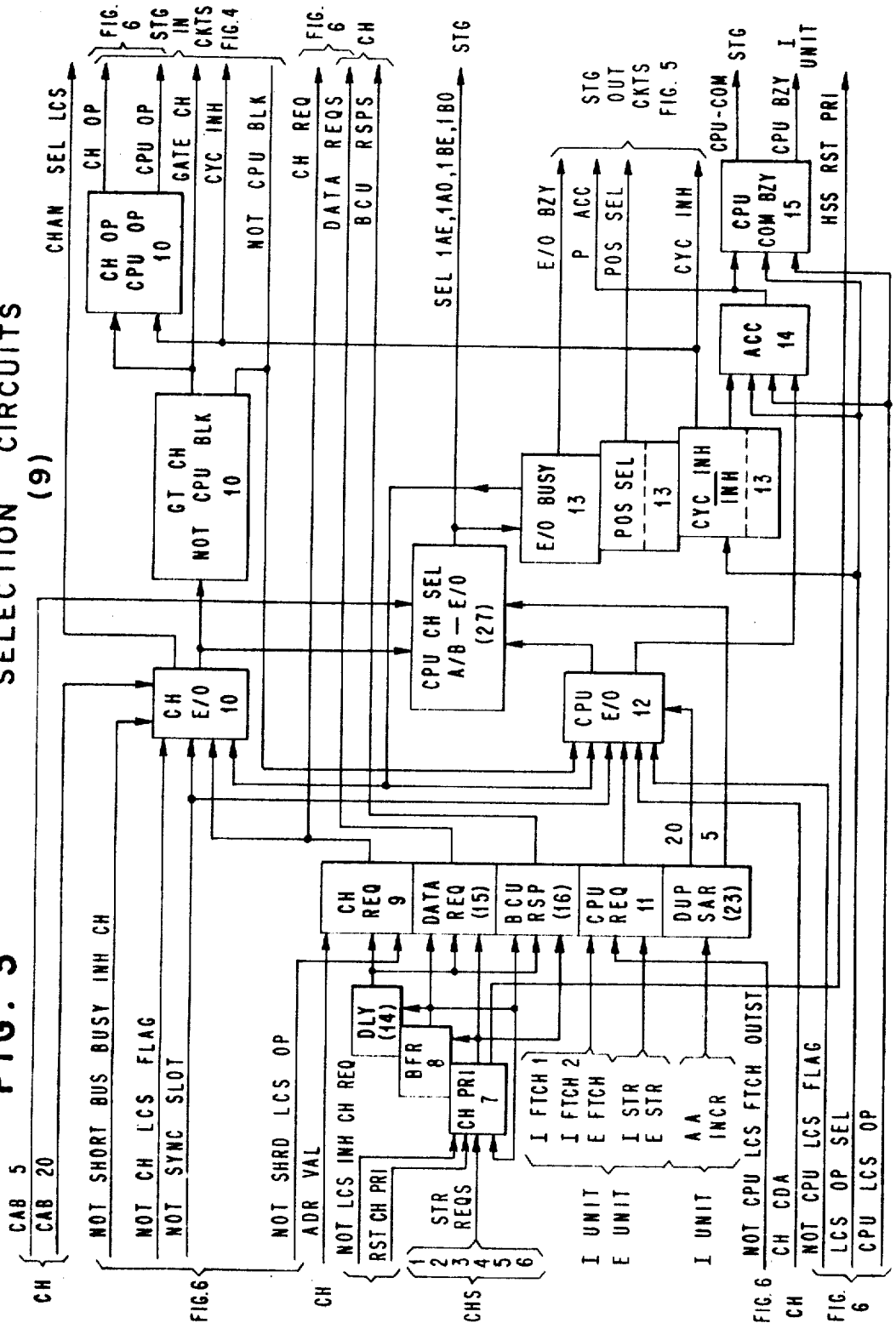

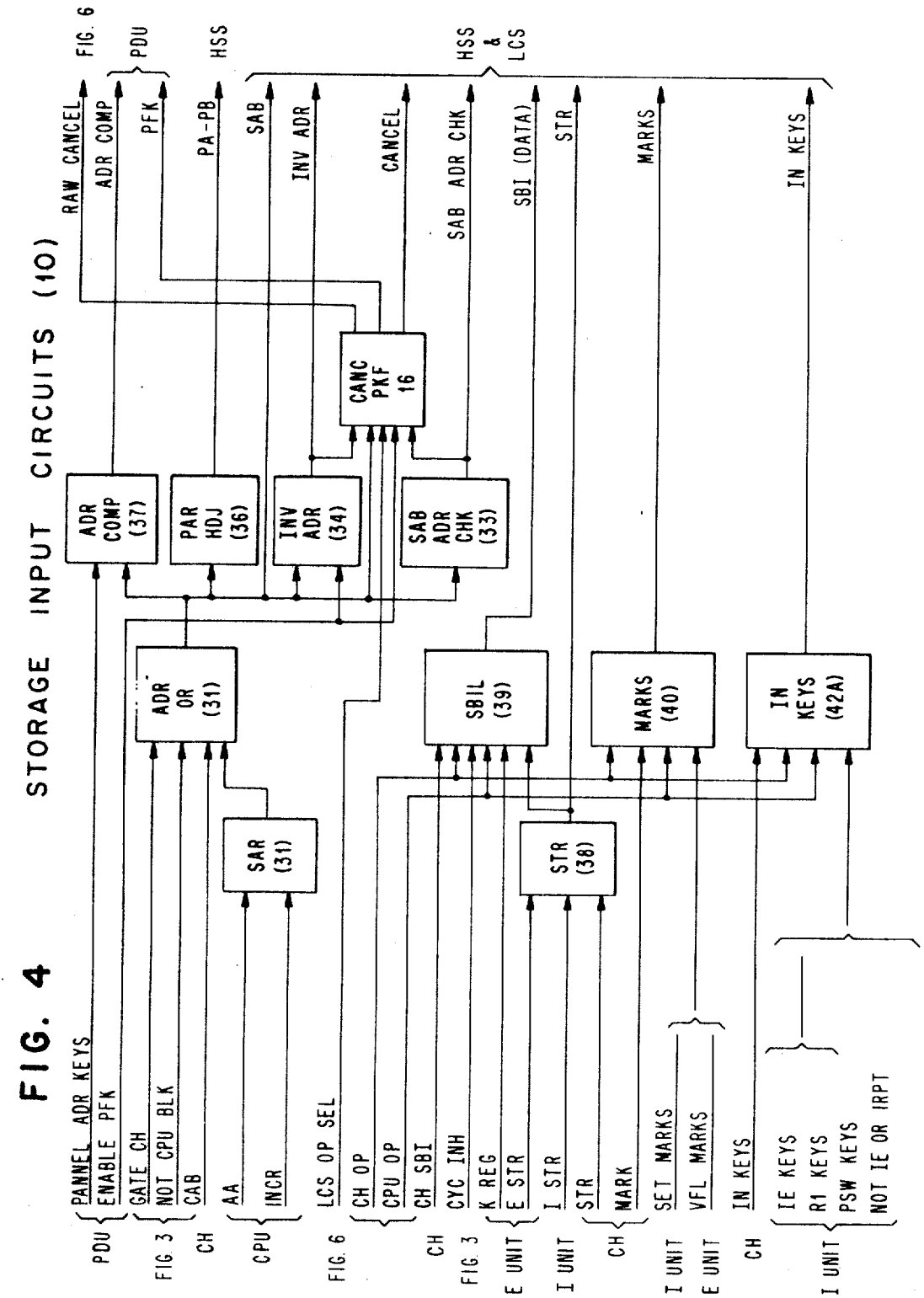

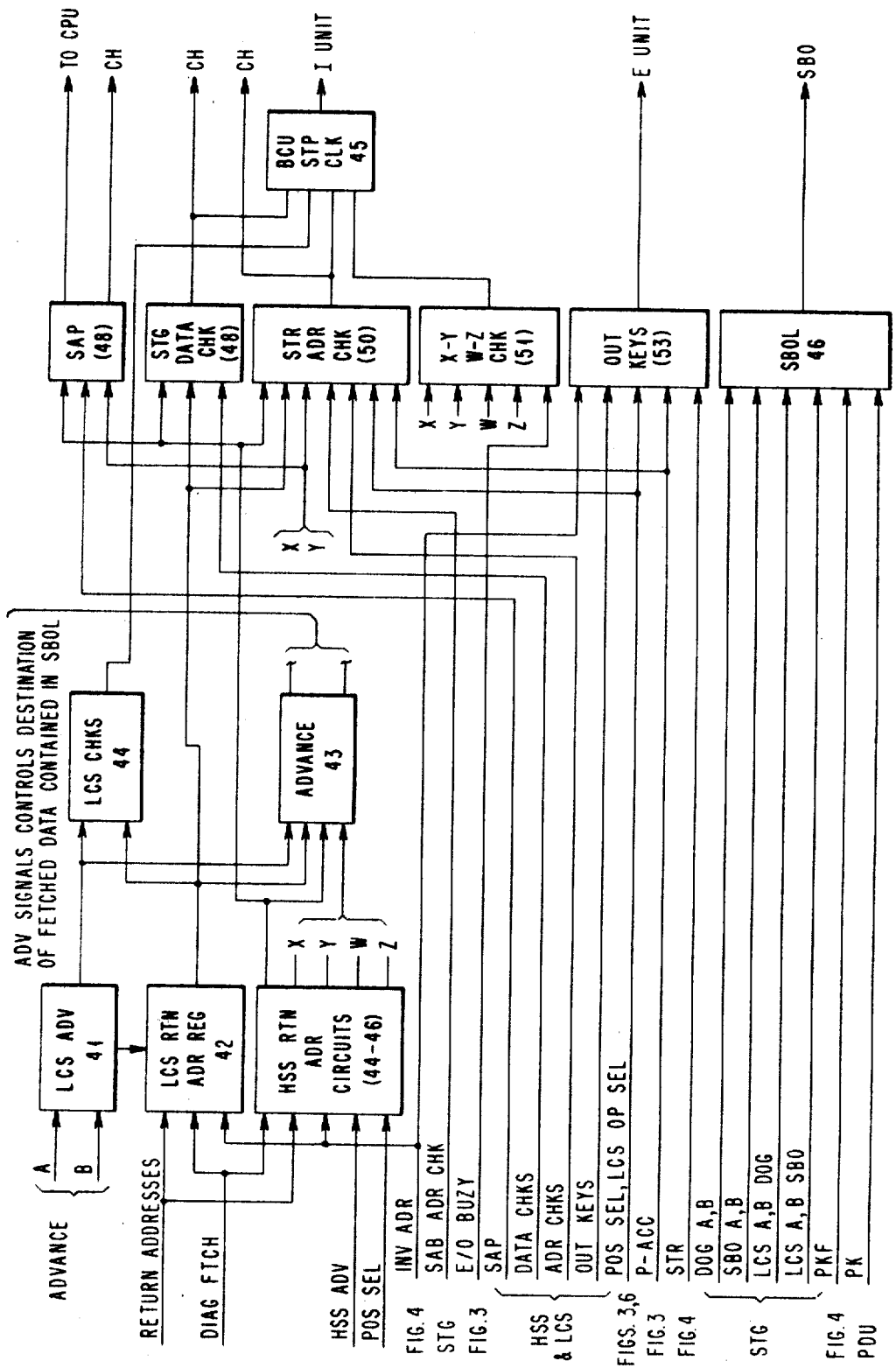

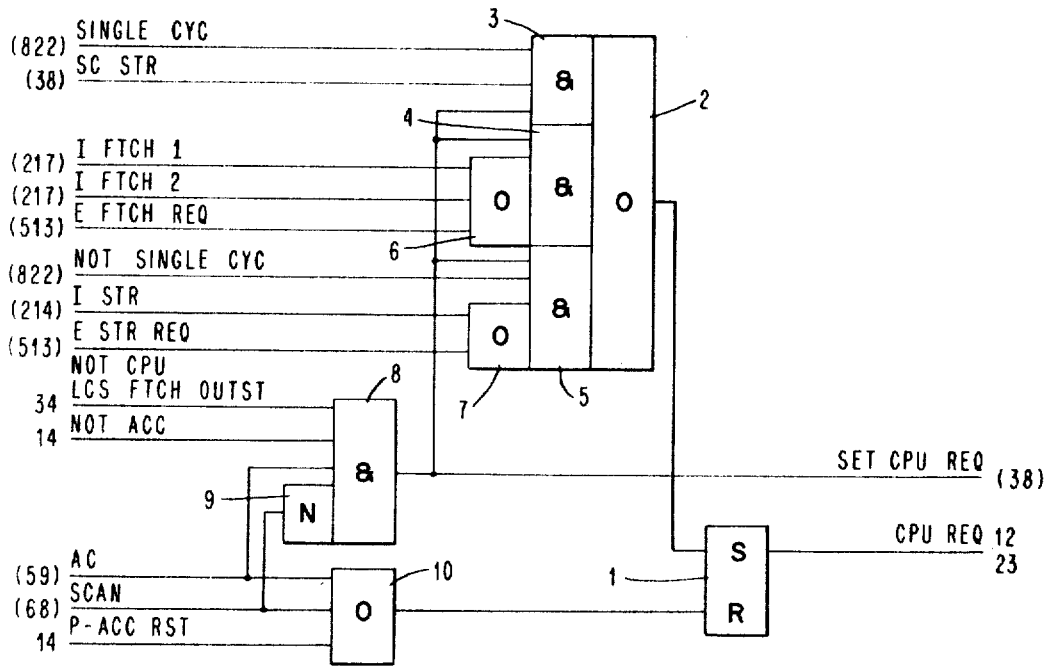
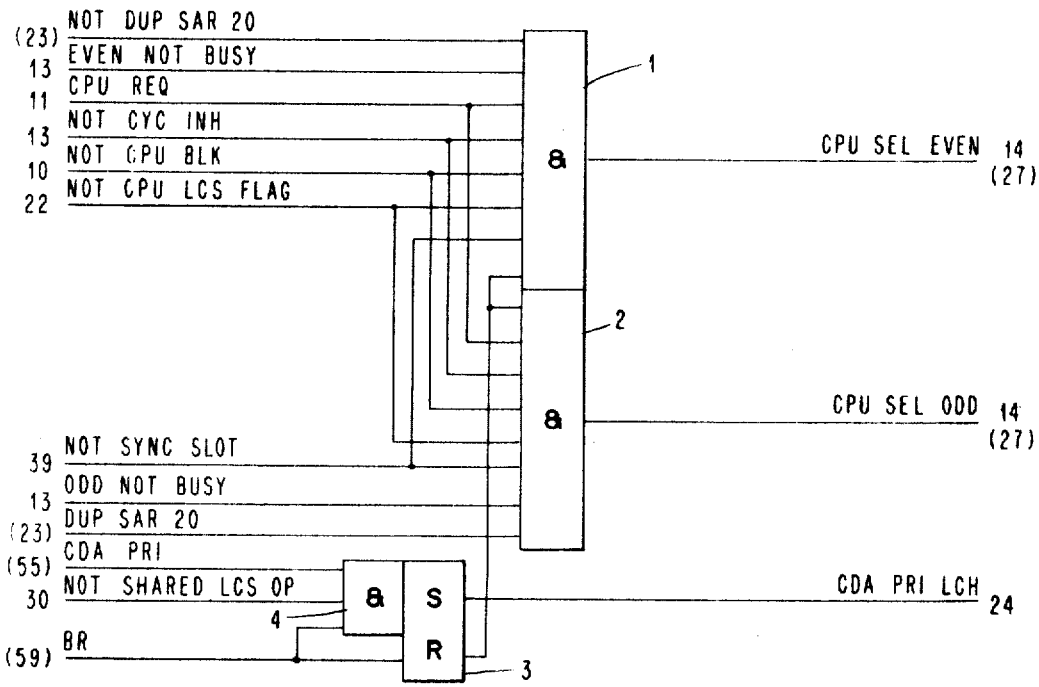

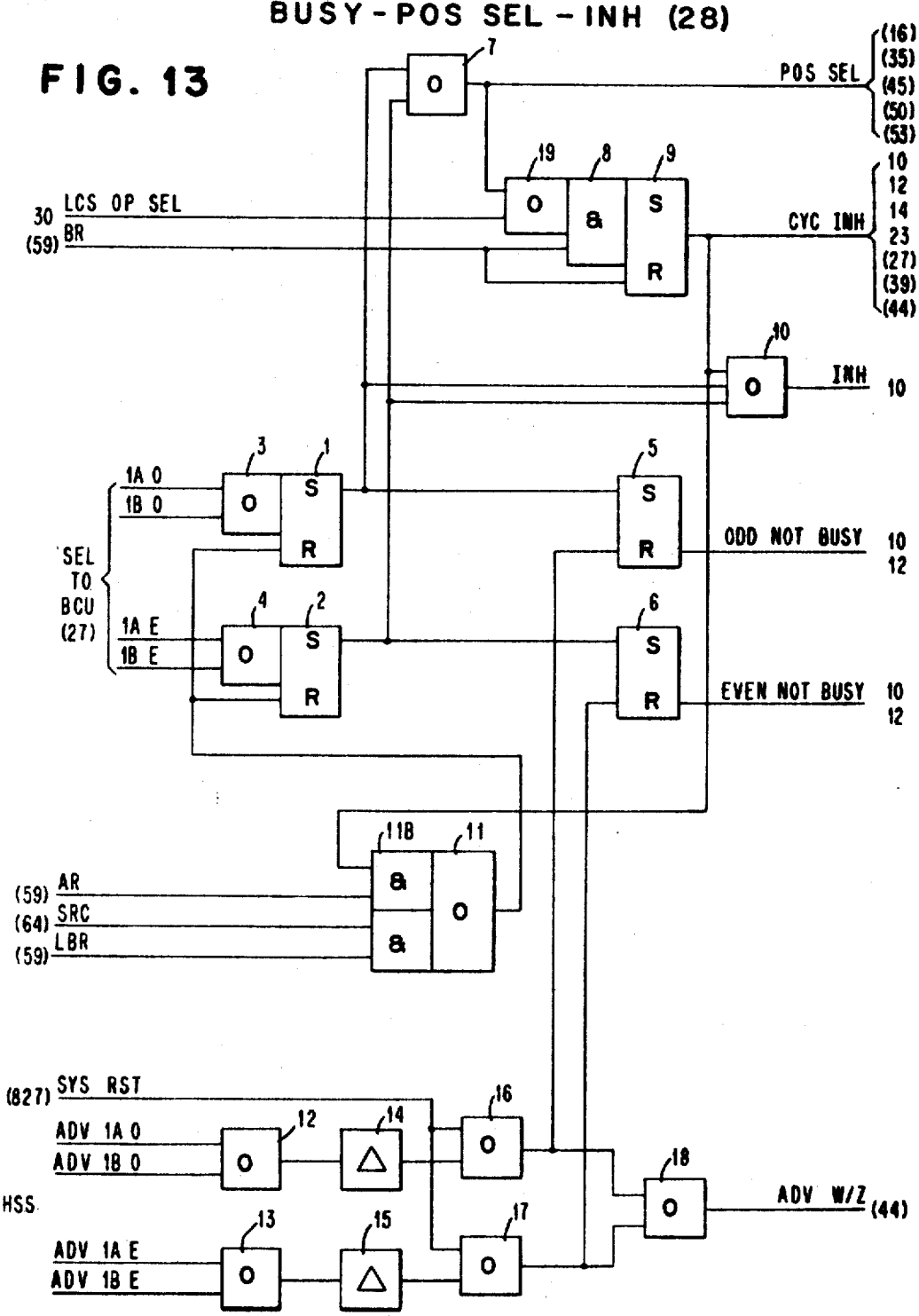

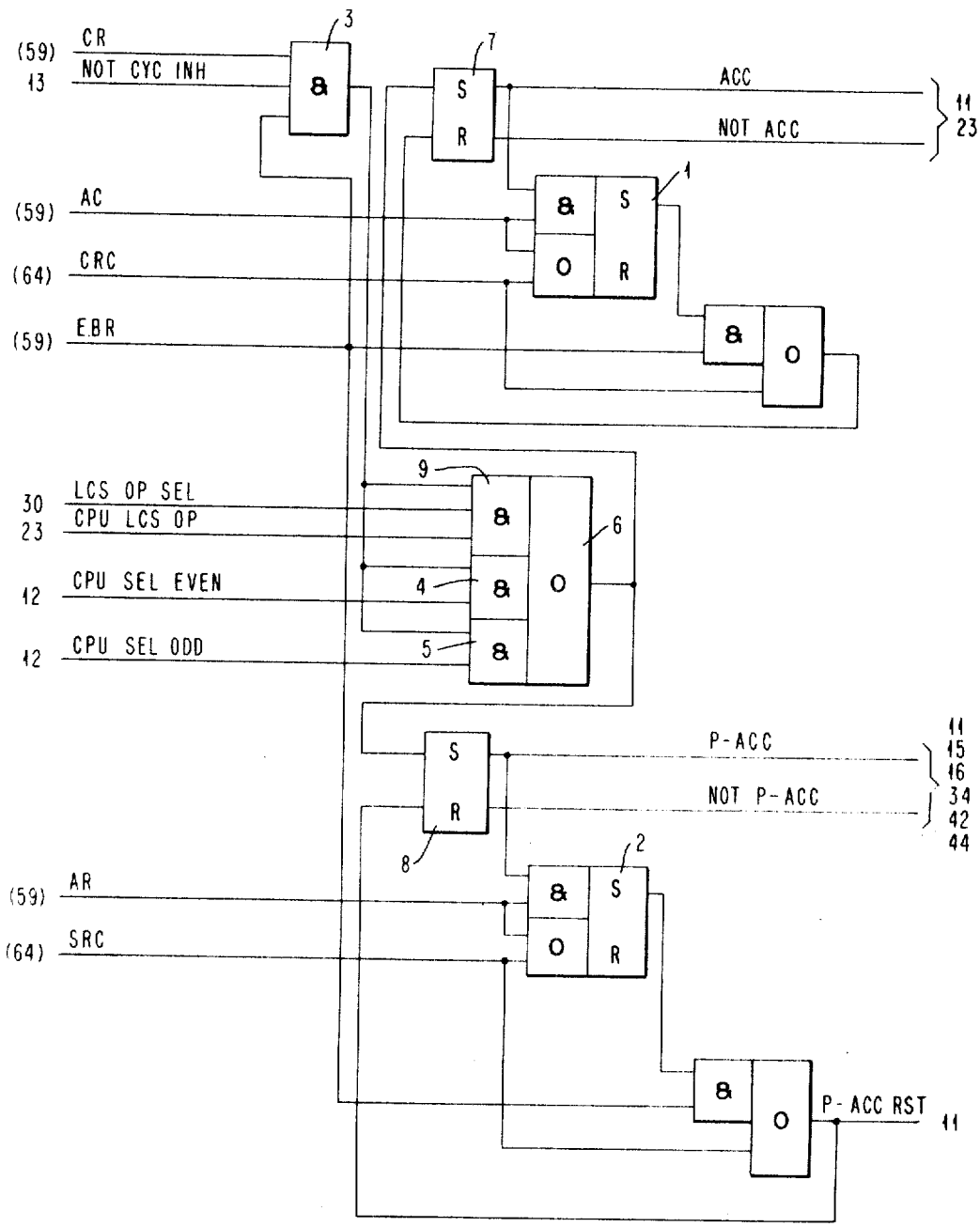

FIG. 15 CPU COM - BUSY (30)
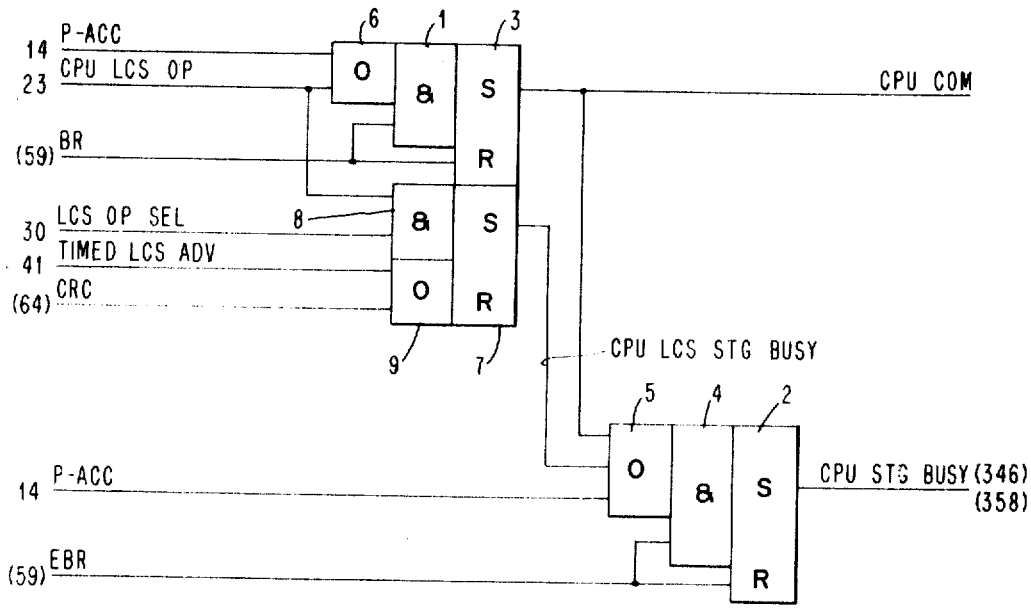
FIG. 16 CANCEL - PKF (35)
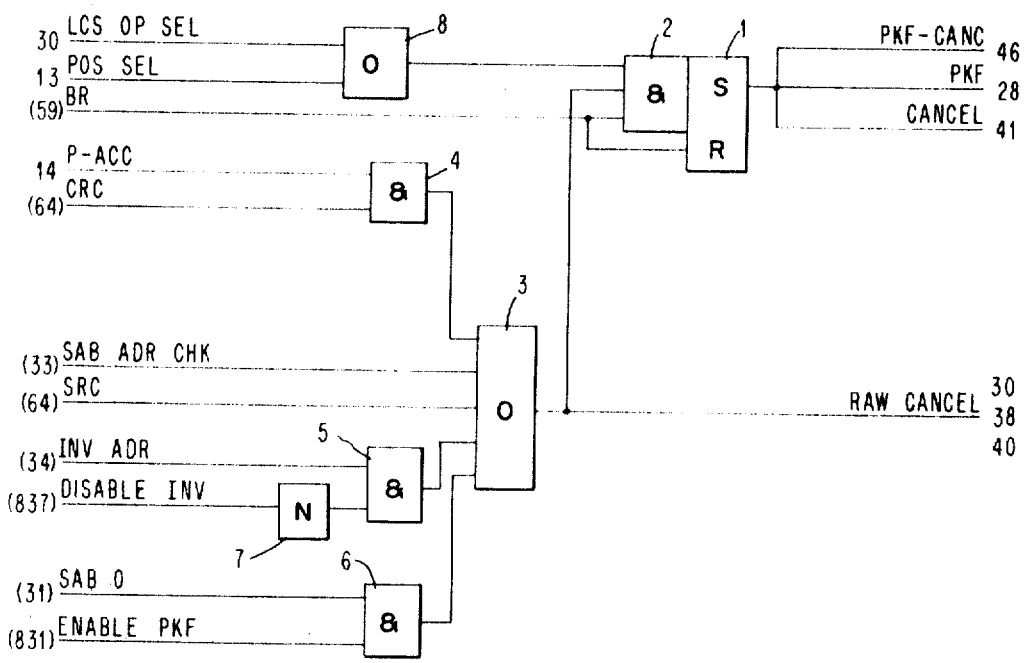

FIG. 17 CH LCS FLAG & SET
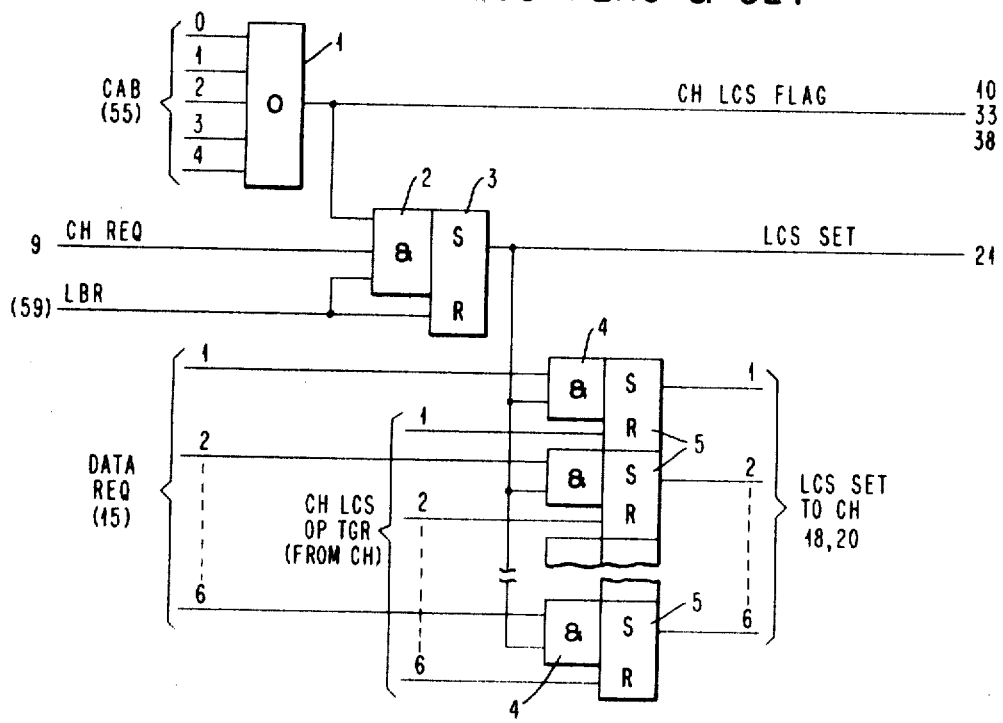
FIG. 18 CH LCS OP INH
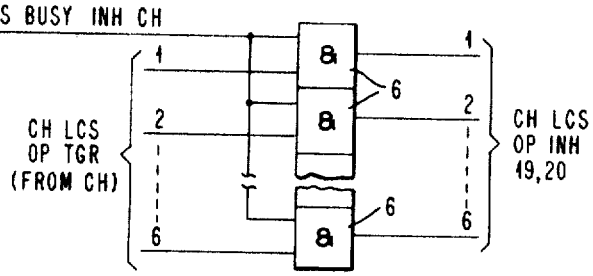
FIG. 19 INH CH REQ
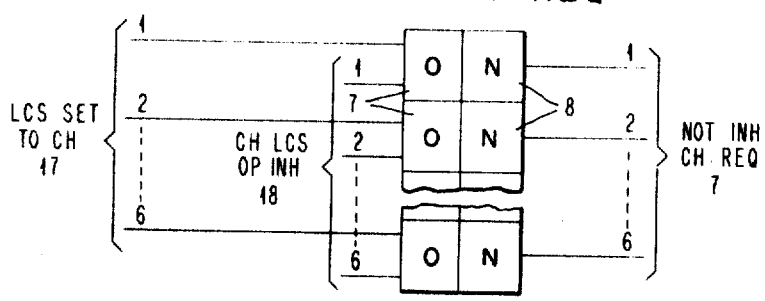

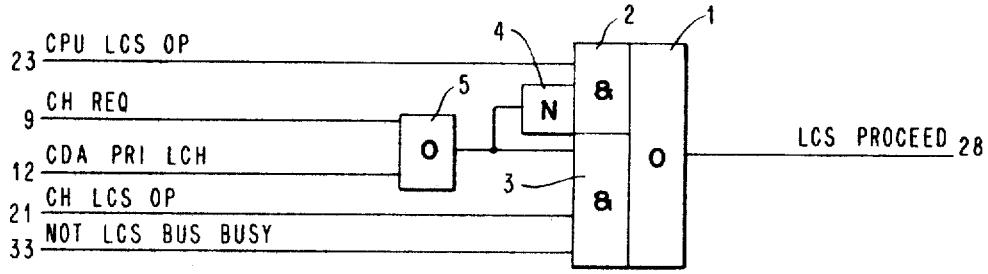
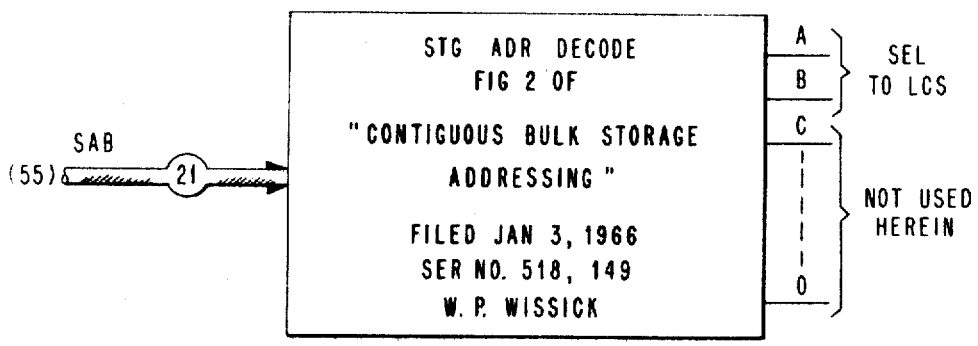
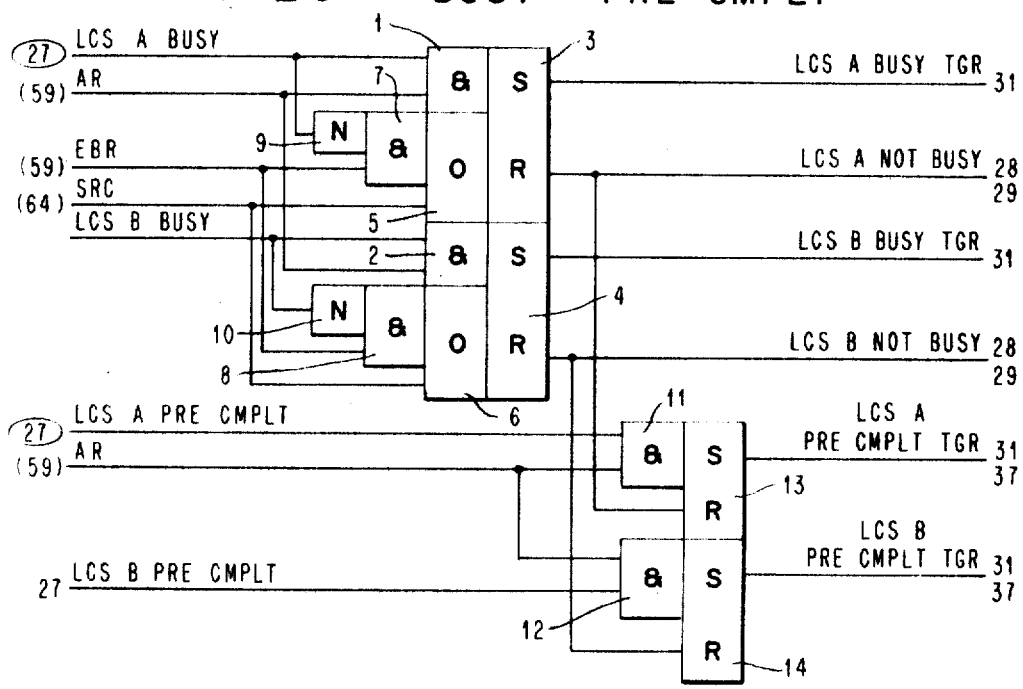

FIG. 29  AVAIL UNSHARED DECODE
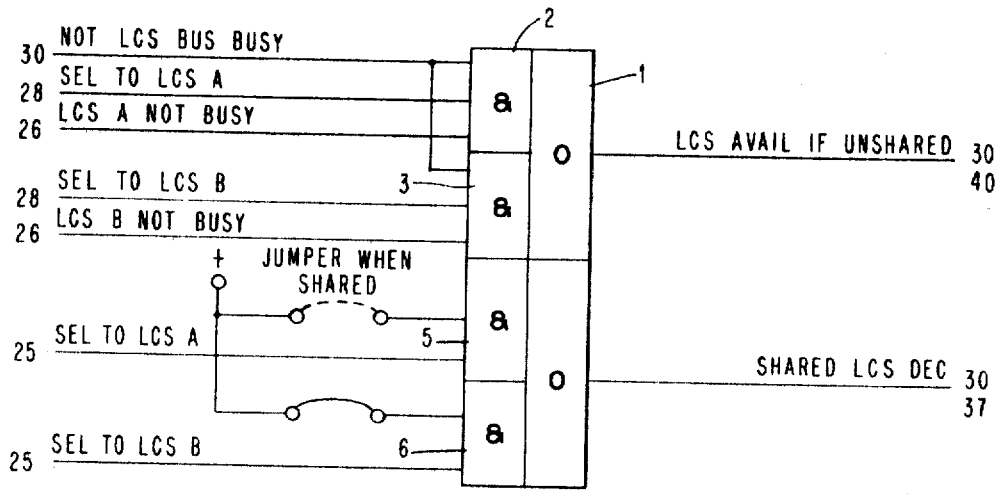
FIG. 30  SHARED LCS OP & LCS OP SEL
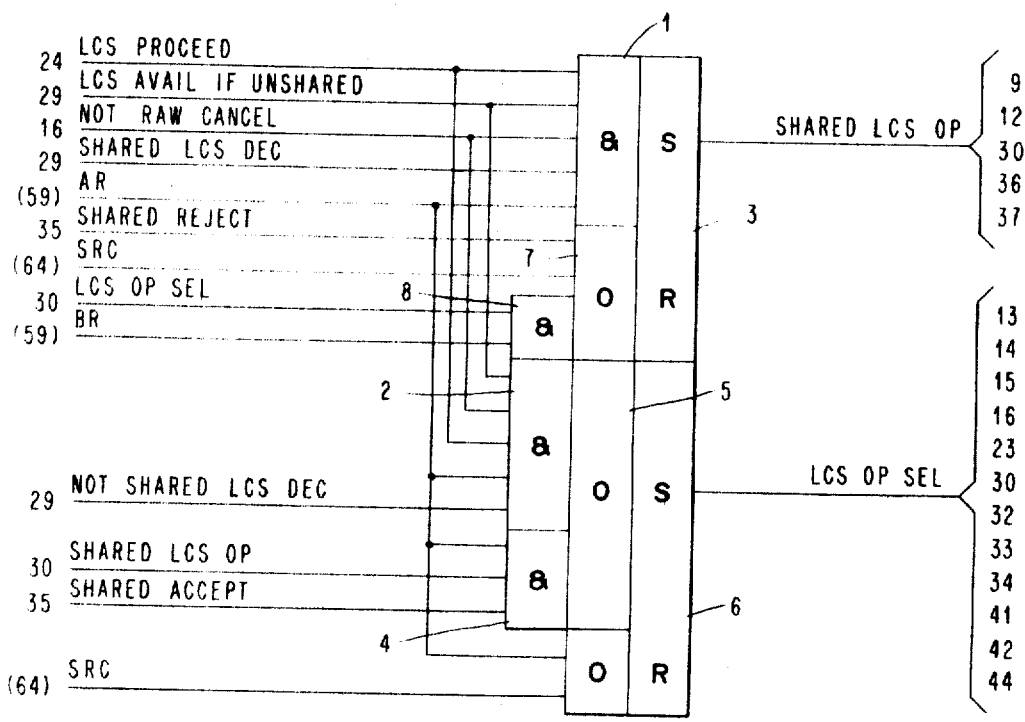

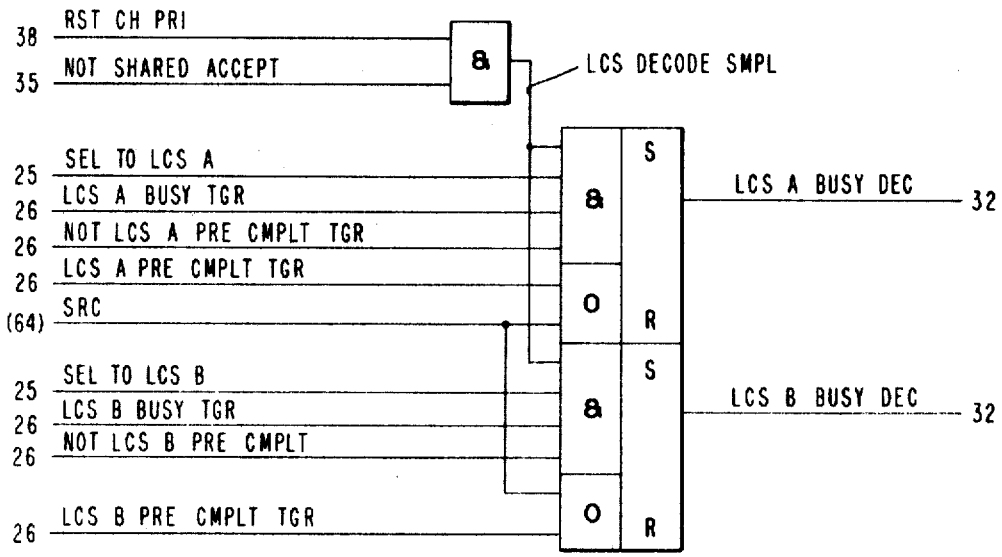
FIG. 31 LCS BUSY DECODE
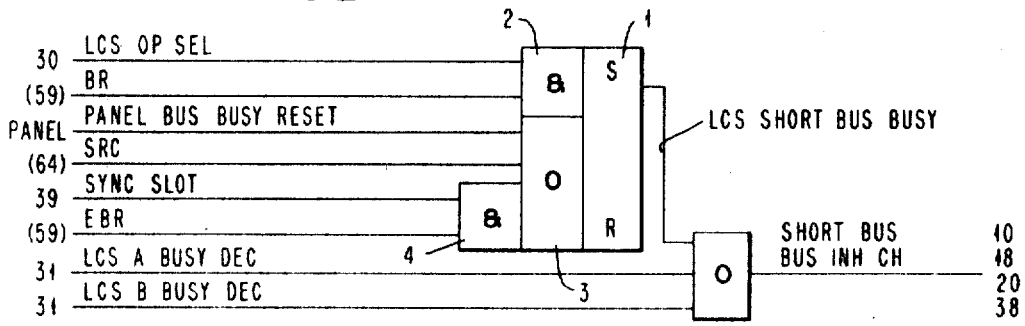
FIG. 32 SHORT BUS BUSY
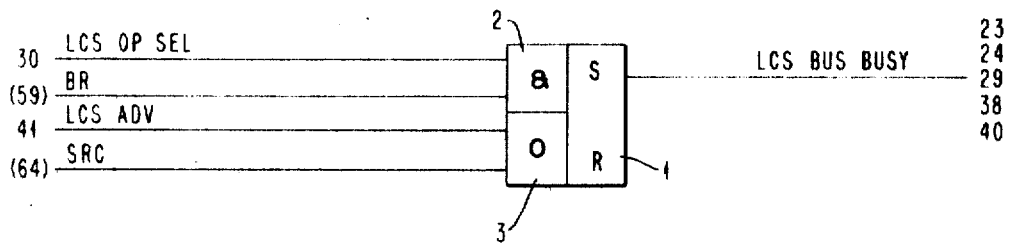
FIG. 33 BUS BUSY

FIG. 34 CPU LCS FTCH
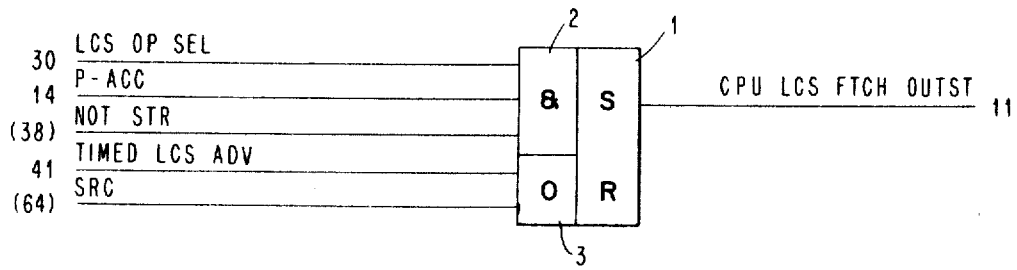
FIG. 35 SHARED ACCEPT-REJECT
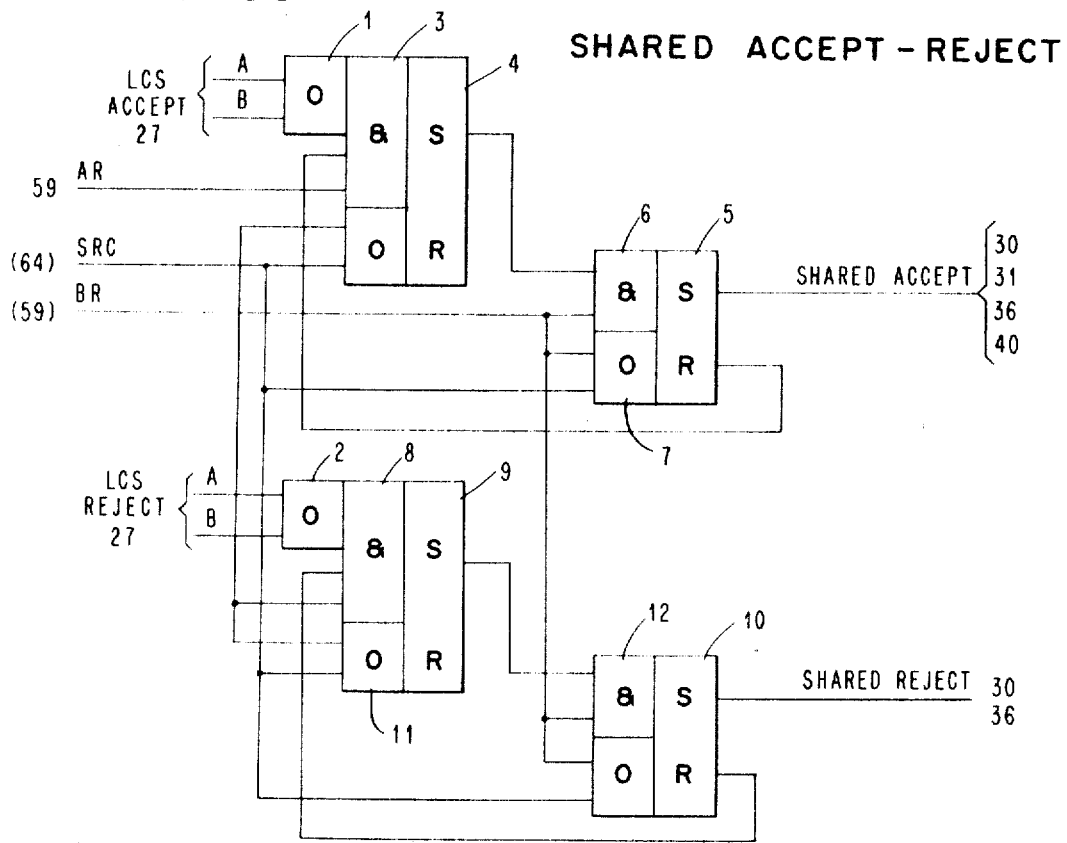
FIG. 36 SHARED RST
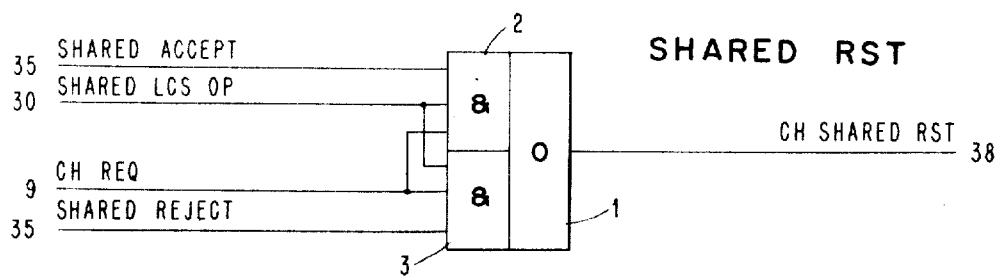

FIG. 42 LCS RETURN ADR REG

FIG. 43    ADVANCE (47)

LCS CHKS

FIG. 45  BCU STOP CLK (52)
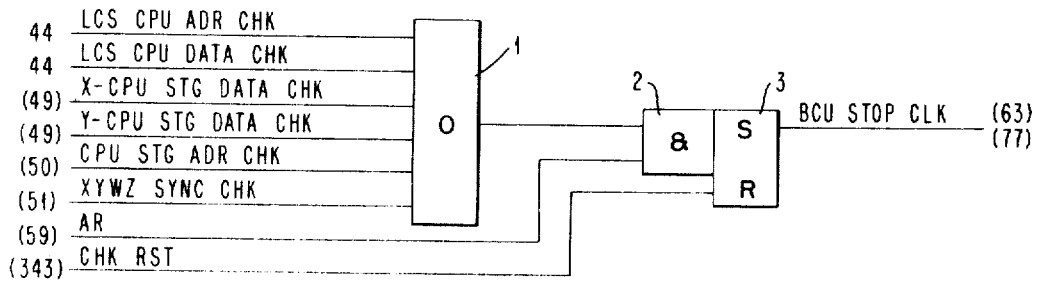
FIG. 46  SBOL (54)
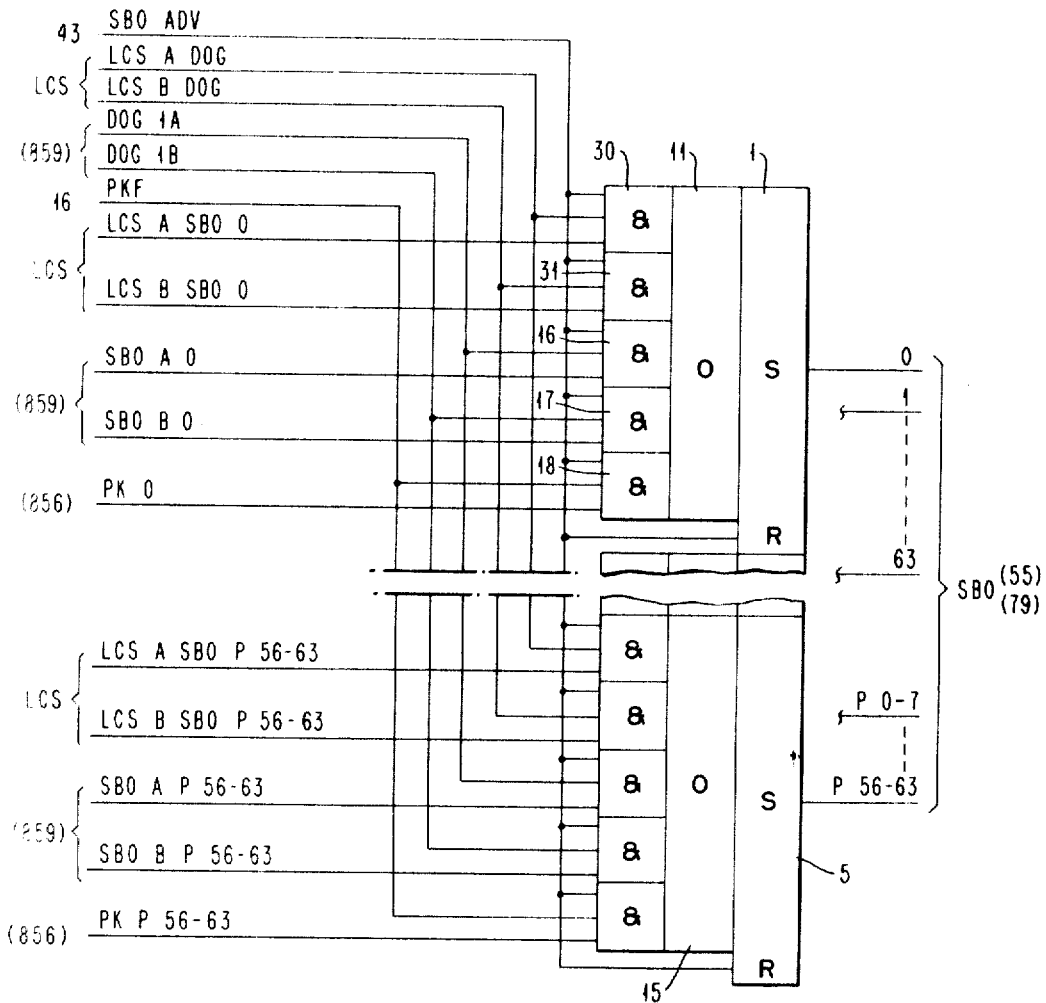

United States Patent Office 3,445,820
Patented May 20, 1969

3,445,820
OVERLAPPED AND UNDERLAPPED ACCESSING
OF MULTI-SPEED STORAGE DEVICES
William P. Wissick, Sunnyvale, Calif., assignor to International Business Machines Corporation, Armonk, N.Y., a corporation of New York
Filed Nov. 10, 1966, Ser. No. 593,439
Int. Cl. G11b *13/00*
U.S. Cl. 340—172.5                               10 Claims

ABSTRACT OF THE DISCLOSURE

Disclosed is a data processing system including a central unit and a plurality of service units, such as data storage devices, wherein the service units may have different operating speeds. Communications between the central unit and the service units are interleaved, that is, communications with a first one of the service units is not completed when communications with a second one of the service units begins. The interleaved communications are of two types called overlapping, where the order with which communications between central and service units terminate is the same order with which the communications began and underlapping, where communications between the central unit and a second service unit begin after communications with a first service unit begin but terminate before communications with the first unit terminate. The communications with the service units are through a control unit which contains common paths between all of the service units and the central unit. The data processing system operates such that the service units themselves control the time of operating through the control unit independent of the time at which that control unit initiates a storage unit operation at accessing time. This independence of operation relegated to the service units allows a control unit to connect a plurality of service units having varying speeds to one or more central units and allows overlapping and underlapping without need for redesign of the control unit no matter what configuration of service units is selected. Service units which are given priority over other units (e.g. slow bulk store) themselves initiate inhibit signals which inhibit operations of those other units (e.g. high speed store) which would interfere with the communication of the unit having priority.

---

This invention relates to data processing, and more particularly to the interleaving of data communications between a central unit and a plurality of service units, such as data storage devices, wherein the service units have different rates of operating speeds, the interleaved accessing occurring on both an overlapped and an underlapped basis.

Large scale, highly-sophisticated data processing systems include systems having storage devices (and other independent devices) which may operate at greatly differing speeds, to which references are made on a somewhat random, intermixed basis. Additionally, such systems may include a plurality of devices of different speed, devices of one speed being operated in an interleaved fashion, such that after one device is started, and before its result is achieved, a second device can be started, and then a third and a fourth, etc. Then the results will come back from the devices one after the other, not withstanding the length of the time that any one device takes to operate.

As a typical example, consider four storage devices having the same operating speed, and a storage bus control unit capable of making references to storage devices at a rate which is four times as fast as the rate at which any storage device may operate. If the storage bus control unit starts one device and then the others in turn, it is possible to keep all four storage devices working simultaneously, each one being at a point within its cycle which is a quarter of a cycle behind one unit and a quarter of a cycle ahead of another unit. The storage bus control unit may send out requests and receive answers at a maximum rate, the difference being that there is a delay between any one request and the answer received. This type of interleaved operation is herein referred to as "overlapping" or "overlapped operation."

As a further example, consider a storage device which has an operating speed on the order of magnitude of one-fourth the speed of another storage device. It is possible in such a case for the storage bus control unit to make a request of the slow device, and while this request is pending, to make a request of the faster device; thus, the result will be back from the faster device before a result returns from the slow device, even though the slow device was started sooner. This latter type of operation is referred herein as "underlapping" or "underlapped operation."

One system is known to the prior art which has the above described characteristics. In that system, the individual timing requirements for each of the fast and slow storage devices are built into the storage bus control unit by means of delay devices. For any given configuration of storage devices on a particular system, the timing will be different than it will be for another configuration of storage devices, or for the same devices installed on another system. Any change in the configuration requires changes in the component delay devices utilized to accommodate the timing requirements of the system.

A primary object of the present invention is to provide a storage accessing control system wherein storage devices of various speeds may be operated in a data processing configuration without requiring that the storage bus control unit of the data processing system be adjusted in its timing relationships in dependence upon the particular units attached to the system.

Other objects of the present invention include the following:

Provision of a storage accessing control device which is independent of the circuit propagation time between the device and storage units controlled thereby, subject to a reasonable maximum propagation time;

Provision of storage access control apparatus capable of operating a plurality of different speed storage devices in a shared system wherein more than one storage access control apparatus may be operative with respect to any of said storage devices;

Provision of improved apparatus for control of relatively asynchronously operable storage devices;

Provision of improved apparatus for accessing a plurality of independent devices shared by more than one such accessing control;

Provision of such apparatus where in the devices may have different operating cycle times;

Procision of apparatus, as before, capable of controlling overlapped and underlapped operation of said devices, even if shared, and even if having different operating speeds;

Provision of various improvements in storage accessing.

In accordance with the present invention, each of a plurality of independent storage devices, which may be of differing speeds, controls its own time of returning data signals to a storage accessing control unit, notwithstanding the time at which service is requested of the storage device by the storage accessing control unit. In one embodiment of the invention, a slow speed, bulk storage device is capable of generating a "SYNC SLOT" signal, the presence of which ensures that no other storage devices can operate if their operation would interfere with the needs of the slow, bulk storage device in communicating with the storage accessing control. The timing is such as will permit an individual system to make requests at the maximum rate of various storage devices, even though said storage devices might be shared with another system; when a storage device is in fact in communication with a given storage accessing control, that storage device will notify the storage accessing control of its impending communication therewith, whereby said storage accessing control will initiate no operations which will interfere therewith.

This invention permits utilizing a variety of storage devices in a variety of configurations with respect to a single system, and more particularly permits utilizing storage configurations in a shared environment wherein a plurality of systems may have access to one or more storage devices without unduly slowing down the rate at which any one storage access control may initiate requests for service by various storage devices. The invention eliminates the need for individually wiring and timing the operation of each configuration and the need for a complex interface of interlocking controls between storage devices and the various systems, whereby a storage device being busy with a different system will not render inoperative the capability of any other system for maintaining properly timed relationships with that storage device.

Other objects, features and advantages of the present invention will become more apparent in the light of the following detailed description of a preferred embodiment thereof, as illustrated in the accompanying drawings.

In the drawings:

FIG. 1 is a simplified schematic block diagram of a pair of data processing systems which are sharing one bulk storage, one of said systems also having access to an additional bulk storage, said configuration comprising the environment, for illustrative purposes, of an embodiment of the present invention;

FIG. 2 is a simplified timing diagram of operation of apparatus illustrated in FIG. 1 in accordance with the present invention;

FIG. 3 is a simplified schematic block diagram of selection circuits adapted for use with the present invention;

FIG. 4 is a simplified schematic block diagram of storage input circuits adapted for use with the present invention;

FIG. 5 is a simplified schematic block diagram of storage output circuits adapted for use with the present invention;

Figure 7:
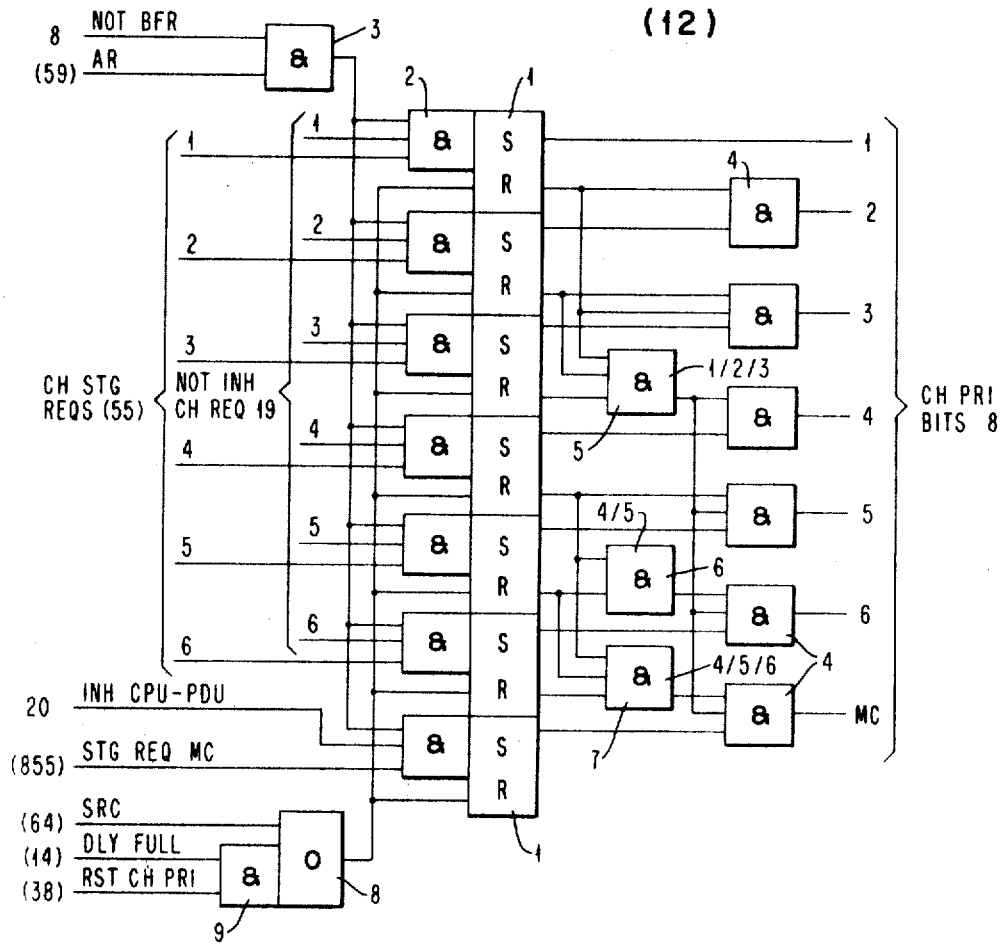
Figure 8:
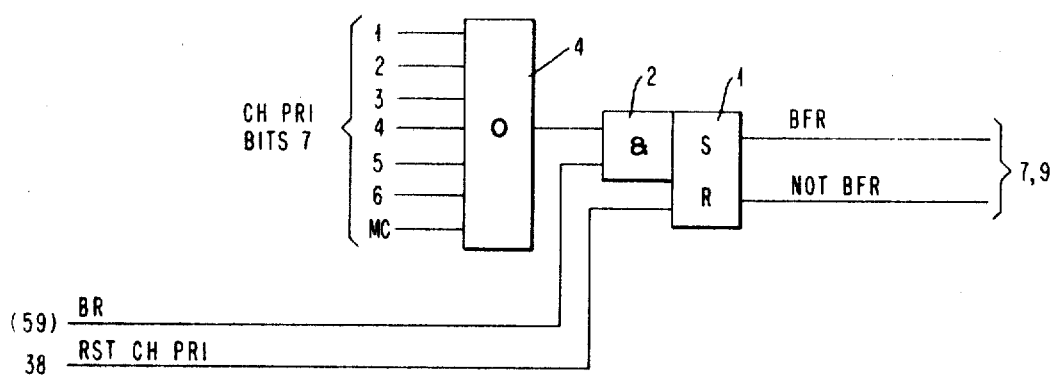
Figure 20:
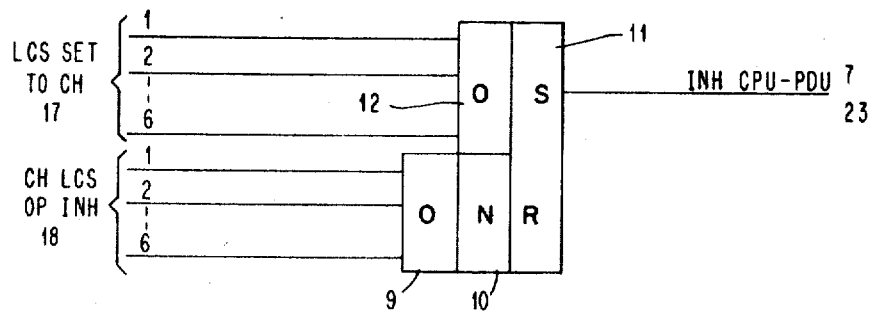
Figure 21:
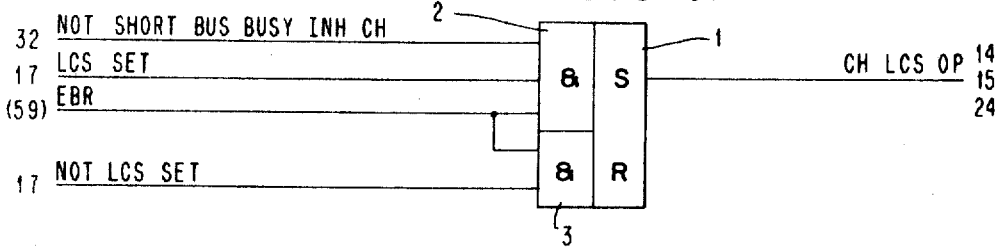
Figure 22:
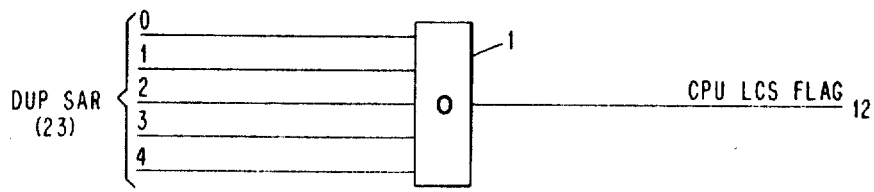
Figure 23:
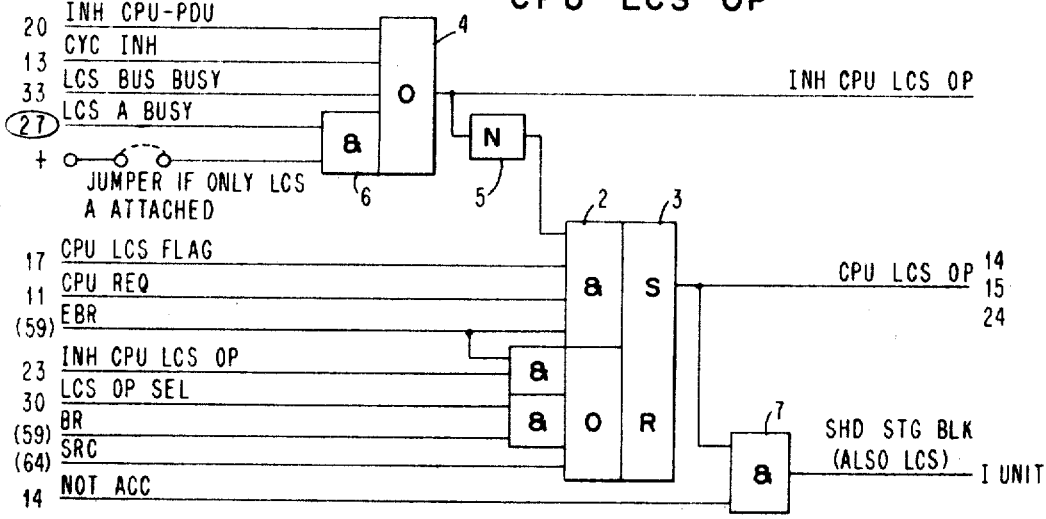
Figure 27:
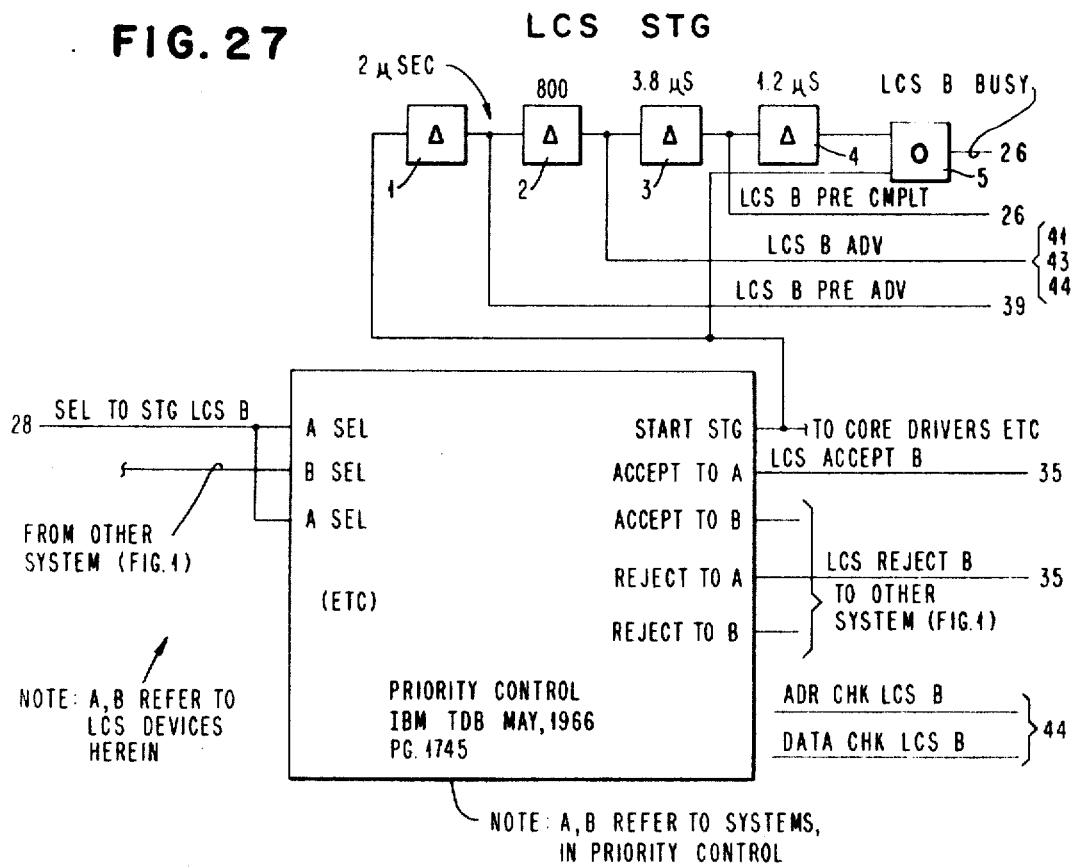
Figure 28:
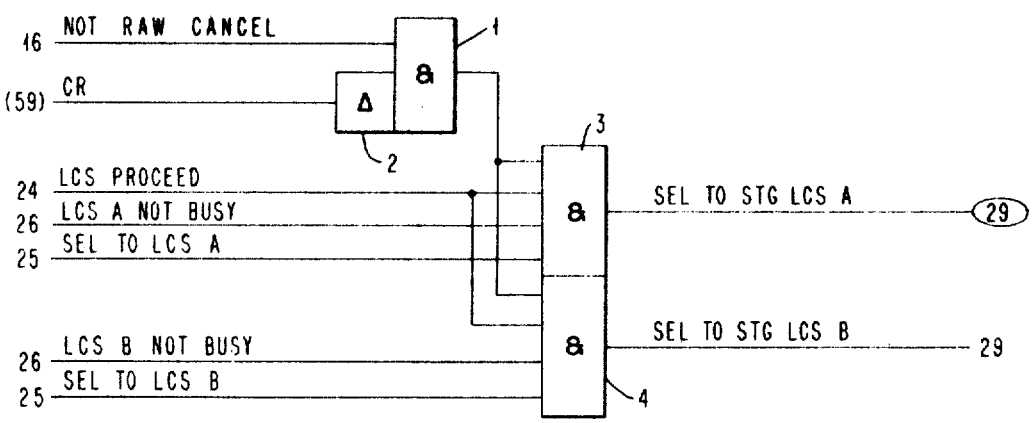
Figure 37:
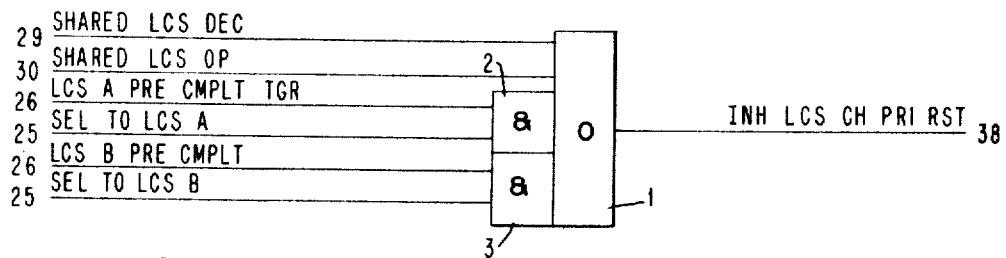
Figure 38:
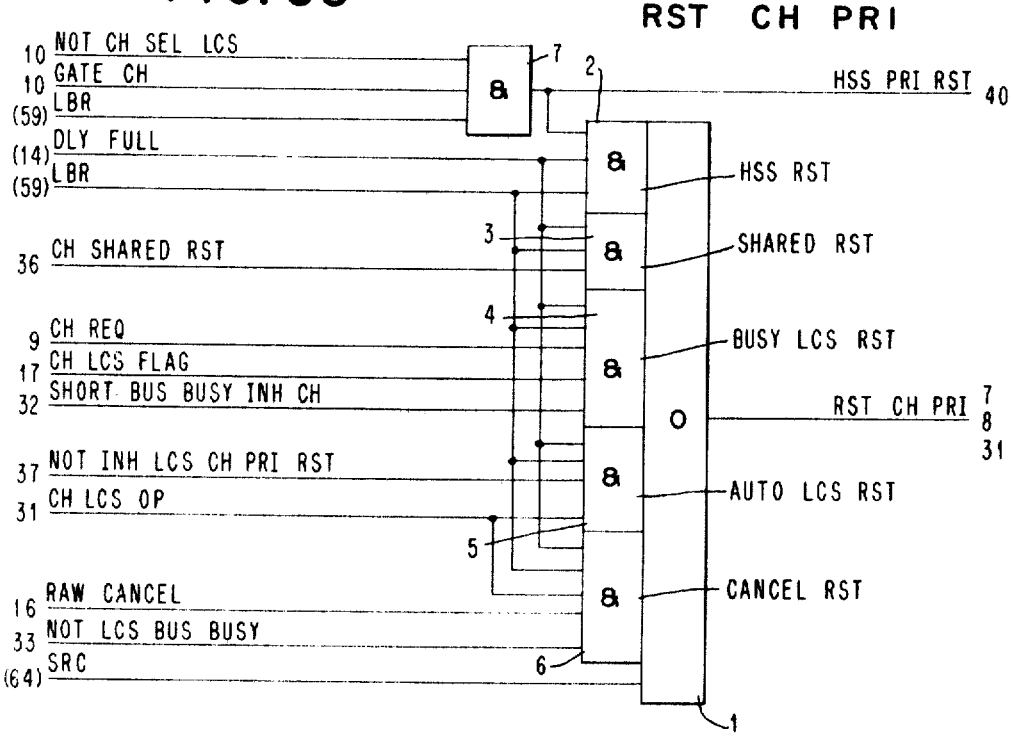
Figure 39:
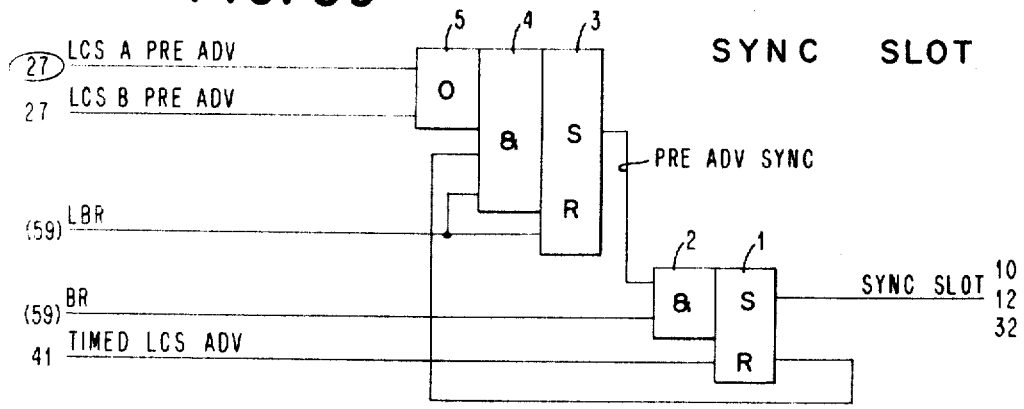
Figure 40:
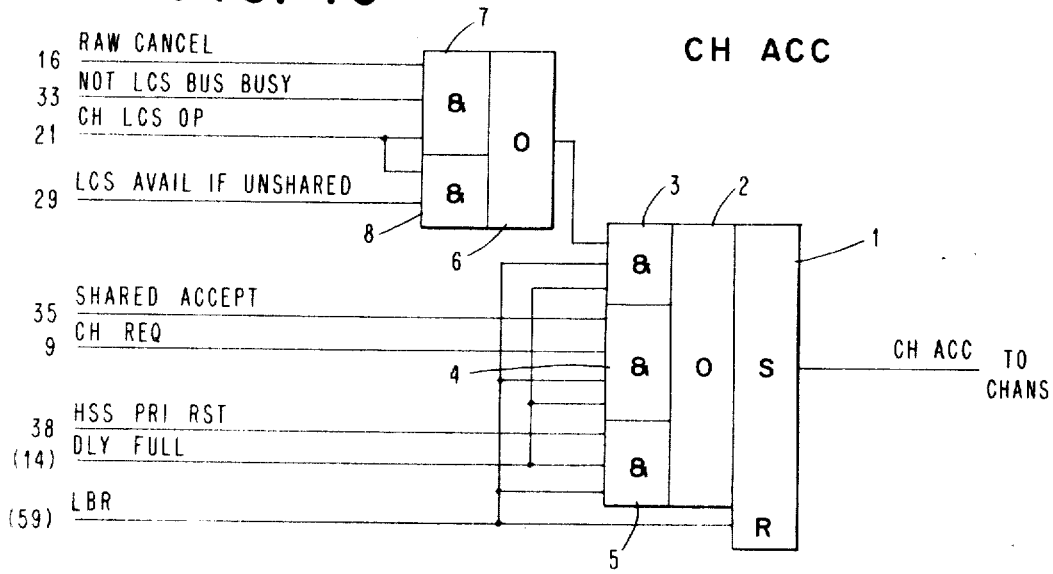
Figure 41:
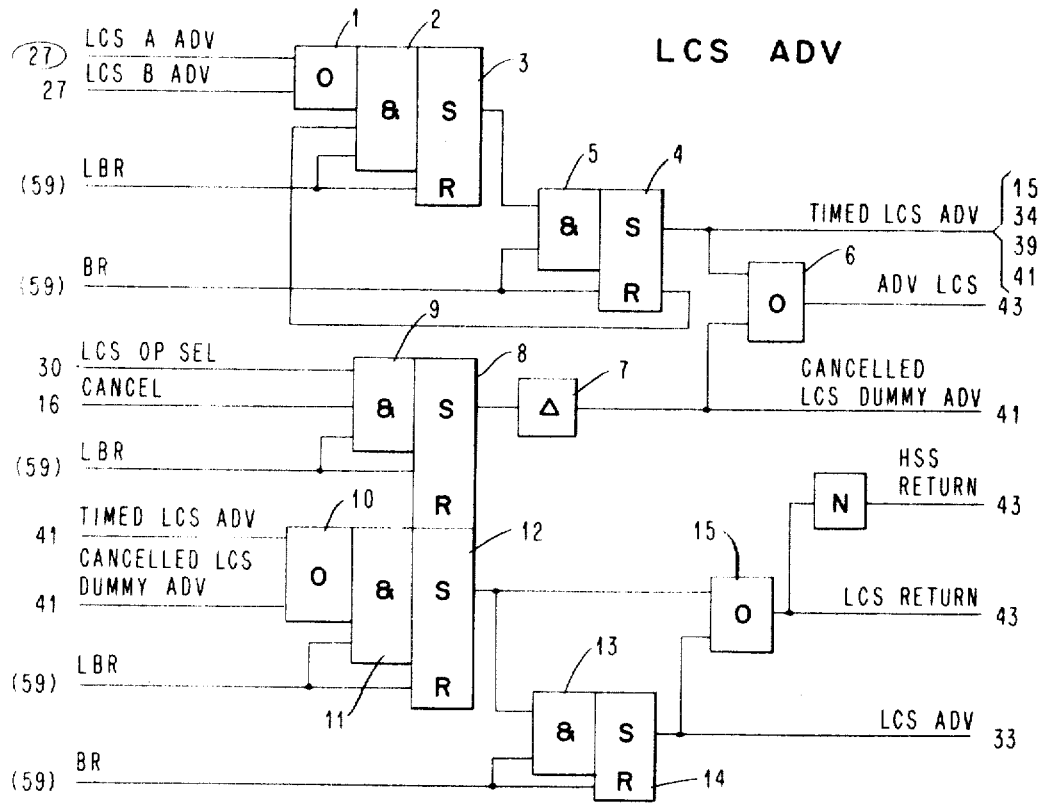
Figure 42:
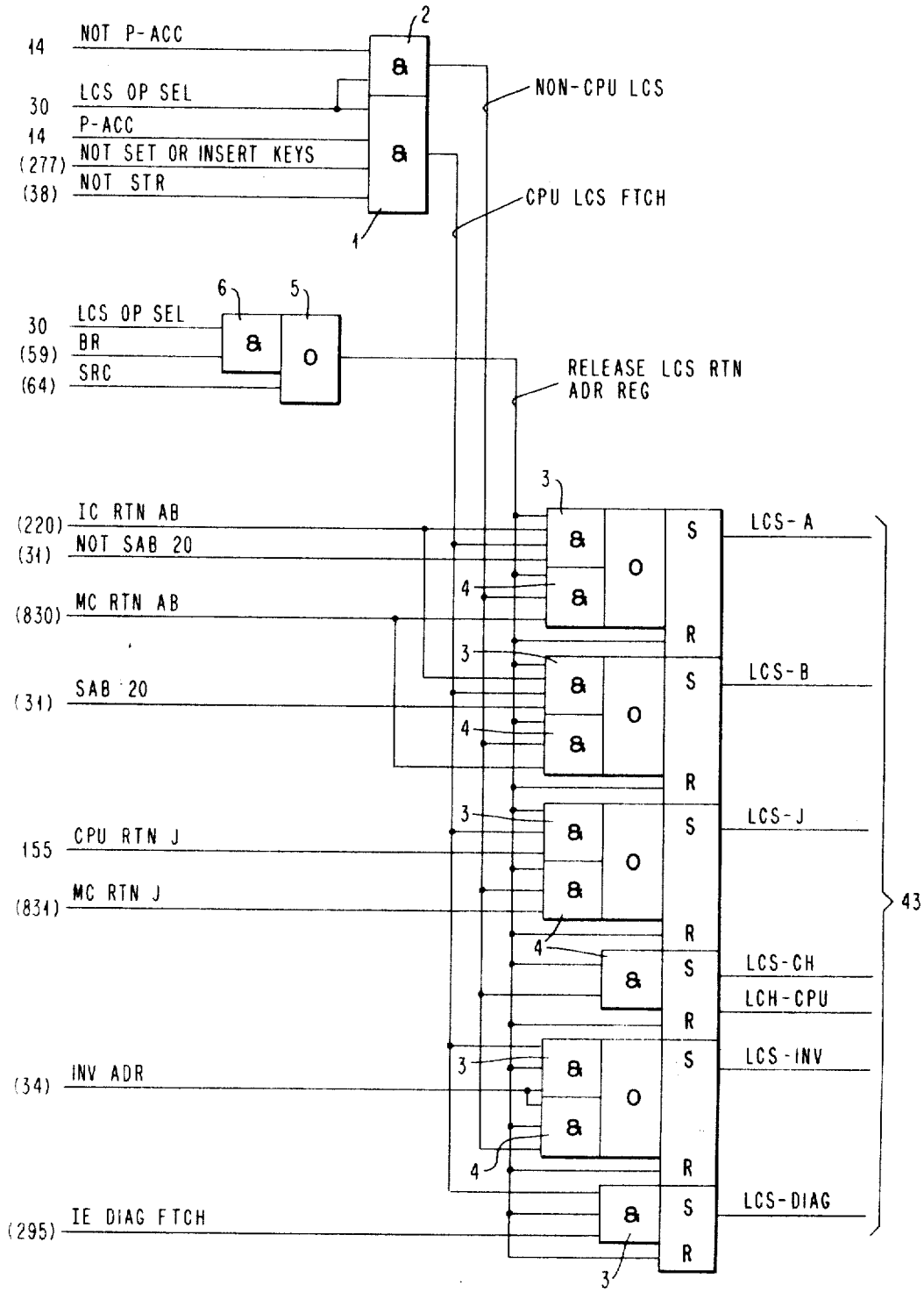
Figure 43:
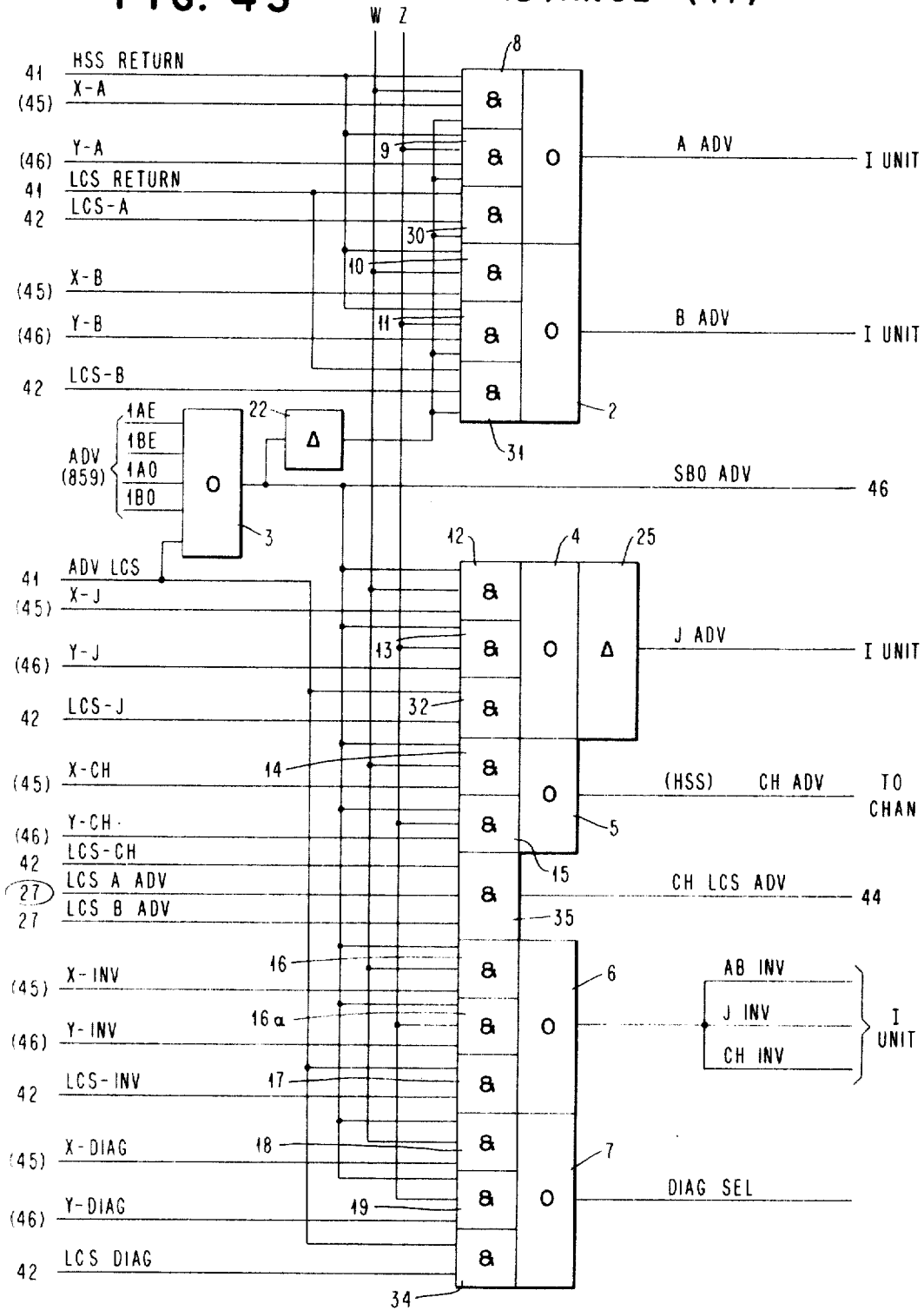
Figure 44:
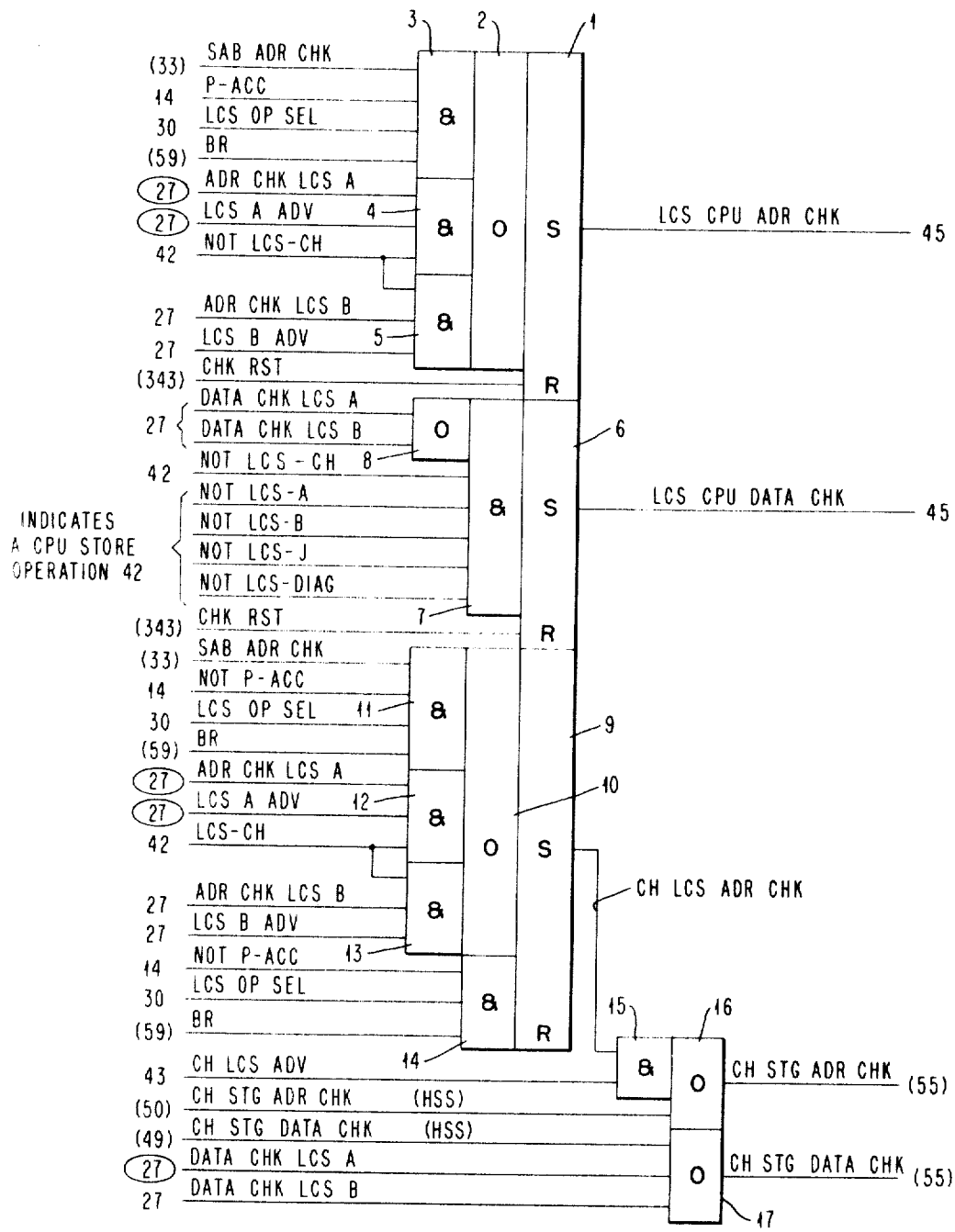

The remaining figures (FIGS. 7–46) herein are simplified schematic diagrams of circuitry for performing the operations referred to in the block diagrams of FIGS. 3–6, certain of said figures being adaptations from a copending application of Olin L. MacSorley, et al., Ser. No. 445,326 filed on Apr. 5, 1965, entitled Large Scale Data Processing System, now abandoned in favor of continuing application having Ser. No. 609,238, filed Jan. 13, 1967, which said adapted circuits bear figure numbers in parentheses, which relate to corresponding figure of said copending system:

FIG. 7—CHANNEL PRIORITY (12)
FIG. 8—BUFFER (13)
FIG. 9—CHANNEL REQUEST (17)
FIG. 10—CHANNEL SELECT (18)
FIG. 11—CPU REQUEST (21)
FIG. 12—CPU SELECT (22)
FIG. 13—BUSY-POS SEL–INHIBIT (28)
FIG. 14—ACCEPT (29)
FIG. 15—CPU COMM–BUSY (30)
FIG. 16—CANCEL–PKF (35)
FIG. 17—CHANNEL LCS FLAG AND SET
FIG. 18—CHANNEL LCS OP INHIBIT
FIG. 19—INHIBIT CHANNEL REQUEST
FIG. 20—INHIBIT CPU–PDU
FIG. 21—CHANNEL LCS OP
FIG. 22—CPU LCS FLAG
FIG. 23—CPU LCS OP
FIG. 24—LCS PROCEED
FIG. 25—STORAGE ADDRESS DECODE
FIG. 26—BUSY–PRE COMPLETE
FIG. 27—LCS STORAGE DEVICE
FIG. 28—SELECT TO STORAGE
FIG. 29—AVAILABLE UNSHARED DECODE
FIG. 30—SHARED LCS OP AND LCS OP SELECT
FIG. 31—LCS BUSY DECODE
FIG. 32—SHORT BUS BUSY
FIG. 33—BUS BUSY
FIG. 34—CPU LCS FETCH
FIG. 35—SHARED ACCEPT–REJECT
FIG. 36—SHARED RESET
FIG. 37—INHIBIT LCS PRIORITY RESET
FIG. 38—RESET CHANNEL PRIORITY
FIG. 39—SYNC SLOT
FIG. 40—CHANNEL ACCEPT
FIG. 41—LCS ADVANCE
FIG. 42—LCS RETURN ADDRESS REGISTER
FIG. 43—ADVANCE (47)
FIG. 44—LCS CHECKS
FIG. 45—BCU STOP CLOCK (52)
FIG. 46—STORAGE BUS OUT LATCH (54).

The following description is based on said copending application of MacSorley et al., the details herein illustrating only the changes required plus additional hardware necessary so as to implement one embodiment of the present invention within the environment of the system disclosed in said copending application.

FIGS. 3–6 herein are simplified block diagrams of the invention, but these are not described in detail inasmuch as the complexity is such as to prevent simplified description on a block basis to any meaningful advantage. Rather, these block diagrams are best utilized to form an overall picture of the method of interconnection of the detailed circuits herein.

Referring to FIG. 2, the basic function of the present invention is to permit taking storage accessing cycles to high speed storage devices inbetween the starting of a storage accessing cycle to a slow, bulk, large capacity storage device (hereinafter referred to as LCS), and the return of data or error conditions from the LCS. As shown in FIG. 2, assuming the first event is the starting of a request to LCS, it is then possible to start a first request to the even half of high speed storage (hereinafter referred to also as HSS), and then start a first request to the odd half of high speed storage before any data returns from any storage device. Then data will return from the even half of HSS in response to the first request; it is then possible to start a second request to the even storage unit after which data will return from the first request to the odd storage unit. This HSS operation "underlaps" the LCS operation. Then a second request to the odd storage unit may be initiated after which no further requests will be permitted due to the operation of the SYNC SLOT signal, which blocks further requests, in accordance with one aspect of the present invention herein. This blocks further high speed storage requests so as to ensure that, by the time data or error signals will be returning from the LCS in response to an LCS request, no other data will be returning so as to interfere therewith. Thus the second request to the even and odd storage devices are returned, and then data is returned from the LCS request. This timing situation is simplified so as to illustrate the operation of a main feature of the present invention: The blocking of high speed requests to guarantee availability of the bus control unit circuitry for accommodating the large capacity storage request. However, the timing arrangement illustrated in FIG. 2 is not detailed nor accurate with respect to the operation of the circuits involved.

The channel priority circuits of FIG. 7 are nearly identical to the channel priority circuits illustrated in FIG. 12 of said copending application. The difference is that a plurality of enumerated channel inhibit control lines are applied to each of the AND circuits 2, so as to inhibit the recognition of any given channel request when that channel request cannot be honored due to the fact that large capacity storage is busy and the channel is requesting large capacity storage. Thus, a request which cannot be serviced right away is set aside, and the remaining channels are allowed to make their requests to the priority circuit during the time that the LCS request cannot possibly be serviced. Additionally, the maintainance channel (MC) is blocked by a CPU–PDU inhibit signal. The generation of these inhibit signals is described with respect to FIGS. 17–20, hereinafter.

In FIG. 8, the buffer circuit is the same as shown in FIG. 13 of said copending application, with the exception of the fact that a more complex channel priority resetting signal is utilized herein, the generation of which is described with respect to FIG. 38, hereinafter.

In FIG. 9 is illustrated the channel request circuits which are similar to those in FIG. 17 of said copending application. The only difference is that the AND circuit 2 in FIG. 9 herein cannot operate during shared LCS operations due to the effect of the signal which is generated on the NOT SHARED LCS OP line described with respect to FIG. 30, hereinafter.

The channel selection circuits of FIG. 10 (compared with the similar circuit of FIG. 18 in said copending application) have an additional AND circuit 9 which generates a signal on a CH SEL LCS line which is similar to the signals on the CH SEL EVEN and CH SEL ODD lines. Additionally, the AND circuits 1 and 2 cannot operate without signals on the NOT CH LCS FLAG and NOT SYNC SLOT lines. Thus, FIG. 10 is illustrative of an element of the present invention: blocking channel selection of even or odd high speed storage devices during the time defined by the SYNC SLOT signal, which reserves the apparatus for the returning of LCS data or error checks. Additionally, if a channel LCS FLAG appears (as described with reference to FIG. 17, hereinafter), then the AND circuits 1 and 2 are blocked since an LCS selection is required.

The AND circuit 9 responds to CHANNEL REQUEST and NOT CYCLIC INHIBIT (as do the AND circuits 1 and 2) and further requires the presence of the CHANNEL LCS FLAG and an indication that the bus control unit is not busy with LCS operations insofar as the channel is concerned, as indicated by a signal on the NOT SHORT BUS BUSY INH CH line. The generation of this latter signal is shown in and described with respect to FIG. 32, hereinafter. Also, when the BCU is reserved for LCS data return, the AND circuits 1, 2 are blocked by the absence of a signal on the SYNC SLOT line (from FIG. 39, hereinafter).

The output of the AND circuit 9 is applied to the OR circuit 3, along with the output of the AND circuits 1 and 2, so as to indicate channel operation, as is described with respect to FIG. 18 of said copending application. In summary, FIG. 10 herein includes a channel select LCS line, and this line is also operative to generate gate channel (GATE CH) and channel operation (CH OP) lines as described in said copending application.

The CPU request circuits of FIG. 11 have but a single modification therein in comparison with the similar circuit shown in FIG. 21 of said copending application. In FIG. 11 herein, the AND circuit 8 will be blocked if a fetch is outstanding from the CPU to the LCS; this is necessary since the CPU of the system disclosed in said copending application must receive its data in order in which it is requested; thus, once a request for data has been sent to LCS, no further requests for data can be permitted from the CPU until the LCS request has returned its data to the CPU. Thus the AND circuit 8 is responsive to a sginal on a NOT CPU LCS FTCH OUTST line, which is generated in and described with respect to FIG. 34, hereafter.

The CPU selection circiuts of FIG. 12 are modified in a manner which is similar to the modifications described with respect to FIG. 10. In particular, FIG. 12 herein differs from FIG. 22 of said copending application in the application to the AND circuits 1 and 2 of signals indicating LCS operation and the SYNC SLOT signal which blocks the operation of these circuits during the time reserved for the LCS to return data through the bus control unit. These signals are applied respectively on the NOT CPU LCS FLAG and NOT SYNC SLOT lines. These lines are generated in and described with respect to FIGS. 22 and 39, hereinafter. In FIG. 12, an additional modification is the application of a signal on the NOT SHARED LCS OP line to an AND circuit 4, so as to prevent setting of the CDA PRI LATCH during shared operations. This is necessary because of the fact that when there is an outstanding CPU–LCS request to a shared LCS, which is accepted, the CPU will have to follow through with that request. Thus, the channel cannot INTERFERE WITH SHARED CPU operations. Furthermore, there is no point in blocking CPU operations (to give the channel immediate access to a storage device) when the required storage device is not available to the channel. The SHARED LCS OP latch is set in response to a request for a shared LCS, and is reset only when the request is either affirmatively rejected, or, when the request, having been accepted, sets the LCS OP SEL latch, indicating that the operation will proceed, which in turn will reset the the SHARED LCS OP latch. Thus, the latch 3 in FIG. 12 herein, will not block the CPU request due to chained data accessing (CDA) priority of a channel whenever the channel is requesting a shared LCS that is not then available to it.

The busy, positive select, and inhibit circuitry of FIG. 13 herein is nearly identical to that illustrated in FIG. 28 of said copending application. The only difference is that the AND circuit 8 will set a latch 9 not only in response to high speed storage positive select (POS SEL) from the OR circuit 7, but also in response to LCS OP SEL due to the effect of an OR circuit 19. Thus, a positive selection of a storage device for operation, when that device has been determined to be available, will cause the setting of the latch 9 which generates the cyclic inhibit signal, to prevent further operation in the bus control unit for one cycle (which establishes the basic rate of the entire bus control unit, as described more fully in said copending application).

The ACCEPT circuit of FIG. 14 herein differs from that illustrated in FIG. 29 of said copending application by the addition of another AND circuit 9 at the input to the OR circuit 6, whereby LCS operation accepted for the CPU may cause the generation of the accept (ACC) and pulse accept (P–ACC) signals as described with respect to FIG. 29 in said copending application. This is achieved in a CPU–LCS request by signals on the LCS OP SEL and CPU LCS OP lines, which indicate that the CPU has requested LCS, and a positive selection of the LCS is resulting.

The CPU communicate and busy circuitry of FIG. 15 herein differs from that of FIG. 30 in said copending application due to the addition of an OR circuit 6 which permits the AND circuit 1 to operate in response to either the PULSE ACCEPT signal (as in FIG. 30 of said copending application) or in response to the CPU LCS OP signal which is generated in and described with respect to FIG. 23 (hereinafter). Also, an additional latch 7 indicates that the CPU is busy with an LCS device; this latch is set by an AND circiut 8 during a CPU LCS operation in response to LCS OP SEL; the latch is reset by an OR circuit 9 in response to a timed version of the LCS advance signal (indicating that data is about to return from the LCS) or in response to computer reset control (indicating that a computer reset is about to occur, as described in Section 6 of said copending application.) The output of the latch 7 is fed to the OR circuit 5 so that the AND circuit 4 can set, not only in response to the CPU COM line (as in FIG. 30 of said copending application), but also in response to the output of the latch 7 whenever the CPU is busy with an LCS storage request.

The description of FIGS. 7–15 hereinbefore completes all of the changes required within the selection circuits of FIG. 9 of said copending application so as to provide selection circuits as illustrated in FIG. 3 herein.

The cancel and panel key fetch circuitry shown in FIG. 16 differs from that of FIG 35 of said copending application only in that the AND circuit 2 is operable either by positive select (as in FIG. 35 of said copending application) or in response to LCS OP SEL, due to the operation of an OR circuit 8. Thus the PKF–CANCEL latch 1 may be set at running B-clock time when any of the conditions of the OR circuit 3 have been met in response to either a selection of high speed storage or a selection of LCS, as indicated by the OR circuit 8. The output of the OR circuit 3 (RAW CANCEL) is used in FIGS. 30 and 40 of the LCS controls (hereinafter).

The modification of FIG. 16 is the only change required in the storage input circuits of FIG. 10 of said copending application so as to provide storage input circuits in accordance with the present invention as illustrated in FIG. 4 herein.

Figure 6:
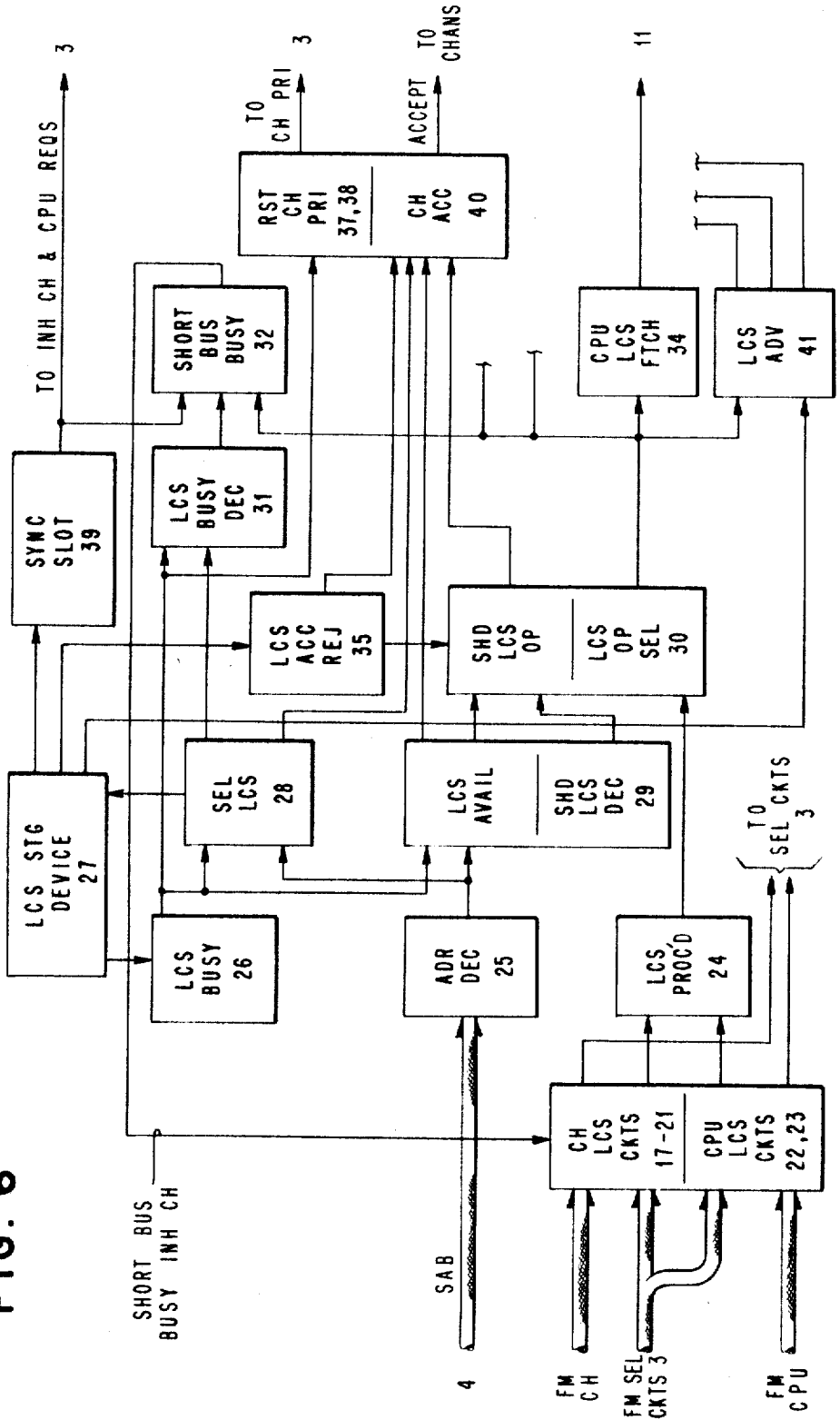
FIG. 6 is a simplified schematic block diagram of large capacity storage accessing controls for use in the present invention.

The following descriptions relate the LCS control circuits which are briefly illustrated in the block diagram of FIG. 6. These are circuits which do not appear in the bus control unit of said copending application, and which must be added thereto so as to provide LCS capability, overlapped and underlapped operation, sharing of LCS in a maximum rate BCU, altering of channel priority inputs by means of the INHIBIT lines, and so forth. The description proceeds in an order which is more or less commensurate with the layout of FIG. 6.

In FIG. 17, the high order bits of the channel address bus are applied to an OR circuit 1 so as to detect address bits indicating that addresses not within high speed storage are being requested; the OR circuit 1 generates a signal on the CH LCS FLAG line. This signal is also applied to an AND circuit 2 which, in response to a late B running clock pulse and a channel request, will cause the setting of the LCS SET latch 3. The output of this latch on the LCS SET line is applied to a plurality of AND circuits 4, each of which relates to a different one of the channels so as to cause a setting of a corresponding latch 5 when a data request signal relating to the corresponding channel is applied to the respective AND circuit 4. The data request signals (generated in FIG. 15 of said copending application) indicate that the particular channel has received priority over the other channels and that the time has come to cause selected channel to send its data to the bus control unit. The outputs of the latches 5 on the LCS SET TO CH lines are sent to the related channels so as to set triggers therein, the trigger in each channel indicating that it has been told that its request relates to a large capacity storage unit.

In this connection, it should be noted that any channel may be utilized with any bus control unit, even without the channel being told in advance how much high speed storage and how much large capacity storage might be available to that bus control unit. In other words, the channel is the same without regard to the storage configuration of the system within which the channel is attached. Thus, the only way for the channel to know that LCS is involved, is to have the bus control unit decode the address bits sent by the channel and determine when an LCS request is being made. The various aspects of HSS vs. LCS configurations, and related addressing considerations, are discussed fully in a copending application of the same assignee, entitled CONTIGUOUS BULK STORAGE ADDRESSING, Ser. No. 518,149, filed on Jan. 3, 1966, by William P. Wissick.

When the channel receives a signal on a related one of the LCS SET to CH lines, it will send a signal back to the bus control unit on a corresponding one of a plurality of CH LCS OP TGR lines. This signal, from any one channel, is applied to a related one of a plurality of AND circuits 6 in FIG. 18, the other input to each of these AND circuits being a signal on the SHORT BUS INH CH line; thus, a certain LCS busy condition within the bus control unit must exist before one of the AND circuits 6 will operate: this is described in detail with respect to FIG. 31, hereinafter. The output of each of the AND circuits 6 comprises a signal on a related one of the CH LCS OP INH lines which are utilized in FIGS. 19 and 20. In FIG. 19 a plurality of OR circuits 7 respond to related lines from each of the channels, the OR circuit 7 being operable either by a signal on the related one of the LCS SET TO CH or CH LCS OP INH lines. The OR circuits 7 each operate a related inverter 8 so as to generate a signal on a corresponding NOT INH CH REQ line, which signals are applied to the channel priority input AND circuits 2 described previously in FIG. 7 herein. Each of these signals therefore prevents the indicated channel from again making a request through the channel priority circuits until such time as the input to the OR circuit 7 disappears, thereby permitting an output from one of the inverters 8.

The signals on the CH LCS OP INH lines are also applied to an OR circuit 9 in FIG. 20. This OR circuit 9 is utilized to indicate to an inverter 10 when none of these signals are present at which time the inverter 10 will reset at latch 11. The latch 11 (when set) generates the INH CPU–PDU signal which is applied to the latch 1 of FIG. 7 which relates to the maintenance channel (the maintenance channel being within the PDU). This latch is set by an output from an OR circuit 12 which may be generated in response to any one of a plurality of LCS SET TO CH lines. In other words, when a signal leaves FIG. 17 to indicate to a channel that it is requesting LCS, the latch 11 in FIG. 20 will be set; this latch will remain set until the output of FIG. 19 indicates that the signal going to the channel is no longer being generated, and further, that no signal returning from an LCS OP trigger (in the channels) has been passed through the AND circuit 6. This is due in part to the effect of the nature of the latch 11 which is set-dominant, and therefore not only must be the latch be reset, but there need be no longer a tendency to set the latch by the LCS SET TO CH lines.

Channel LCS operations are manifested in a latch 1 shown in FIG. 21. The latch 1 is set by an AND circuit 2 in response to the LCS SET signal from FIG. 17 concurrently with a signal on the NOT SHORT BUS BUSY INH CH line at early B runnig time. The latch 1 is reset by another AND circuit 3 at early B running time in response to the absence of the LCS SET condition as indicated by a signal on the NOT LCS SET line. Thus the latch 1 in FIG. 21 can turn on only if channel LCS operations are not inhibited by SHORT BUS BUSY; it will turn on with LCS SET and be turned off one cycle after the removal of the LCS SET.

A signal on the CPU LCS FLAG line is generated in FIG. 22 by an OR circuit 1 in response to any of the high order address bits from the duplicate storage address register (DUP SAR) indicating CPU address bits of a sufficiently high order as to be specifying other than high speed storage. (See copending Wissick application, supra.). This signal is applied to an AND circuit 2 in FIG. 23 so as to set the CPU LCS OP latch 3 in response to a signal on the CPU REQ line provided that there are no inhibits being generated by an OR circuit 4, the output of which is inverted by an inverter 5 so as to block the operation of the AND circuit 2. The OR circuit 4 responds: to the signal on the INH CPU–PDU line, which signal is generated in FIG. 20 as described hereinbefore; to the cyclic inhibit line described with respect to FIG. 13 hereinbefore; or to the LCS BUS BUSY line, indicating that the bus control unit is busy with respect to any LCS request. The OR circuit 4 is also responsive to an AND circuit 6, in the event that a jumper is attached, so as to permit the operation of the AND circuit 6 whenever LCS A is busy. This will cause the bus control unit to indicate that no LCS accessing can be done whenever LCS A is busy in a configuration in which only a single LCS (LCS A) is attached. Thus, although two different references to LCS A and LCS B might be made herein, if there were no LCS B, then no LCS references could be made when LCS A is busy. This is the function of the AND circuit 6. If there are no inhibit signals out of the OR circuit 4, then the inverter 5 will permit the AND circuit 2 to operate whenever a CPU request is accompanied by a CPU LCS FLAG so as to set the latch 3 indicating a CPU LCS operation. The output of the latch 3 is also applied to an AND circuit 7 which causes a shared storage block signal until an accept signal is received indicating that the CPU LCS request has been accepted. The signal on the SHRD STG BLK line out of AND circuit 7 in FIG. 23 causes the CPU to freeze in the particular cycle in which it is found at the time that a CPU request is recognized as being for an LCS storage device. This is necessary because the central processing unit operates in accordance with a stored program, and the data utilized within the program must be received before the processing operations can proceed in the CPU. Thus, when a bulk storage device (LCS) is being referenced by the CPU, it means that the CPU must stop operating long enough to allow sufficient time for the data, which has been requested by the CPU from the LCS, to be returned to the CPU. The line is applied to a variety of circuits within the CPU, as described in the following discussion, wherein shared storage block is referred to as SSB.

In the case of references to high speed storage (HSS), where the BCU controls busy status (FIG. 13), unhonored requests may be cancelled unconditionally. When adjunctive storage faciilties such as LCS are used, however, cancellations are not always permissible because the BCU does not exercise direct selection control. The CPU is not made aware that its request has been honored until the storage cycle has already started (LCS OP SEL). If an attempt is made by the CPU to cancel at this critical time, the returned results will be unpredictable and may interfere with previous register settings or subsequent storage references.

The rules governing cancellation and the utilization of SSB to nullify cancellation effects are outlined below:

Requests which may be cancelled by the CPU include instruction counter (IC) fetches, fetches to fill the second instruction buffer during a branch operation (BR+1), and operand fetches (OPF). Store type requests are never cancelled.

IC fetches may be cancelled by pre-decoding (PD BLK IC), IOP decoding (ID BLK IC), or as the result of an interrupt. BR+1 fetches may be cancelled when the branch is found to be unsuccessful, and OPF's may be terminated by an interrupt reset.

The essential function of SSB is to maintain requests, storage addresses, and return addresses, in spite of cancellations, until the BCU specifies they are no longer required. In particular, the BCU will normally drop SSB if the request is honored (ACC) or if a shared storage indicates that it is busy and cannot immediately accommodate the request. When SSB is dropped for any reason, the CPU is then free to maintain the old request, drop requests altogether, or initiate a new request to any storage. This flexibility helps to minimize the impact of LCS operations on normal activities.

While SSB is up, requests must be maintained by the CPU to guarantee that advances and returning data are actually associated with the request outstanding, rather than with a previously cancelled request. To insure the return of desired data, proper storage and return addresses must be supplied by the CPU as long as SSB is up. Also, whenever a fetch request is initiated to LCS, a return address must be referred to the BCU even if the returned data will never be used. Failure to make an entry in the appropriate return address bank could otherwise cause a store data check condition resulting in a needless machine check operation.

Another function influenced by SSB is the CPU storage busy line (CPU STG BUSY, FIG. 15) generated by the BCU and used as an interlock by interrupt controls. SSB must be "ORed" with CPU BUSY, defined in the above reference, to insure both the proper turn-off of J-LOADED and servicing of possible Storage Address Protection checks (SAP). Note further that SSB is timed by the BCU to rise and fall at the same time within a machine cycle as does ACCCEPT.

In FIG. 24, circuitry determines that either a CPU LCS operation or a channel LCS operation is able to proceed, not taking into account whether or not the requested LCS is available. Thus, a signal is generated on an LCS PROCEED line by an OR circuit 1 in response to either one of two AND circuits 2, 3. The AND circuit 2 operates in response to a signal on the CPU LCS OP line provided there is an output from an inverter 4 which in turn responds to an OR circuit 5 either when there is a channel request or when the CDA PRI LCH line is activated. Thus, the AND circuit 2 is blocked during a channel request or during a chain data accessing operation from one of the channels. The AND circuit 3 responds directly to the OR circuit 5 when there is concurrently present signals on the CH LCS OP and NOT LCS BUS BUSY lines. These indicate that the channel has requested an LCS unit, and that the bus control unit is not busy with some other request for LCS.

The LCS PROCEED signal is applied to FIG. 30 in combination with a plurality of other signals which relate to the actual address, the busy status, and the shared status of the LCS unit which is indicated by the actual address; these signals are generated in FIGS. 25–29.

FIG. 25 is illustrative of storage address decode circuitry as shown in the aforementioned copending application of the same assignee filed on Jan. 3, 1966, by William P. Wissick, Ser. No. 518,149, entitled CONTIGUOUS BULK STORAGE ADDRESSING. The circuitry therein permits addressing bulk storage on either a shared or unshared basis, with gaps in the addressing, and without regard to whether or not a shared storage device bears the same relative address position in both systems. For simplicity in this case, a configuration of sixty four thousand (64K) words of high speed storage with two small LCS units, each including 128,000 words of storage, has been chosen. Thus, the arrangements would be (referring to FIG. 10 of said copending addressing application) high speed storage as shown in the 64K addressing example, with two S LCS units as illustrated for S LCS A and S LCS B (in the 32K storage addressing example in FIG. 10 of said copending addressing application). The net effect herein is that when suitable address bits are presented, LCS A or LCS B may be designated by the SEL TO LCS lines (A and B) in the circuit shown in FIG. 25 herein. The output of the address decode circuit in FIG. 25 is applied to FIGS. 28, 29, 31, and 37 so as to provide further decoding indications of the condition of the desired LCS unit.

Referring now to FIG. 26, a signal from the related LCS indication that either LCS A or LCS B is busy will cause a corresponding AND circuit 1, 2 to set a related latch 3, 4 at A-time, thus manifesting the busy condition of the LCS units. Each of the latches 3,4 is reset by a related OR circuit 5, 6 in response to a system reset control signal (SRC) or in response to a corresponding AND circuit 7, 8 whenever the related LCS is not busy, as indicated by inverters 9, 10 at running early B-time. Thus, whenever an LCS becomes busy, a related busy latch (or trigger) 3, 4 will be set at A-time, and will remain set, generally, until early B-time following the end of the busy condition.

The fact that an LCS, though busy, will soon become non-busy is manifested in signals on LCS A PRE CMPLT and LCS B PRE CMPLT lines, respectively. These will cause related AND circuits 11, 12 to set corresponding latches (or triggers) 13, 14 so as to manifest the pre-complete condition until such time as the busy trigger is actually turned off, which will cause the related pre-complete trigger 13, 14 to be reset.

The busy signals and pre-complete signals come from the LCS units themselves, a manifestation for LCS unit B(LCS B) being shown in FIG. 27. This is a simplification of a clocking apparatus which provides certain signals indicative of the advancement through various stages of the operation of the LCS unit in response to that LCS unit being affirmatively selected. Thus a signal on a SEL TO STG LCS B line will pass through a series of delay units 1–4 in FIG. 27 so as to generate a sequence of signals which corresponds to the status of LCS B in its operating cycle. The first signal is on the LCS B BUSY line, which goes on with the START STG signal. Then the signal on the LCS B PRE ADV line is generated at the output of the delay unit 1 about two microseconds following the selection of the LCS unit. Then a signal is generated on an LCS B ADV line at the output of delay unit 2, 800 nanoseconds following the pre-advance signal. Similarly, a signal is generated on the LCS A PRE CMPLT line by delay unit 3 approximately 3.8 microseconds after the advance signal. Finally, the BUSY signal will turn off after a total of 7.8 microseconds following the START STG signal, due to a 1.2 microsecond delay unit 4.

The SEL TO STG LCS B line which controls FIG. 27 is the output of LCS select circuits shown in FIG. 28. The circuit of FIG. 28 recognizes that LCS selection is permissible as between the channel and CPU selection circuits, and that the LCS which is desired is not busy. Furthermore, a signal on the NOT RAW CANCEL line is applied to an AND circuit 1 so as to generate an LCS selection gating signal a short time after running C-time, as determined by a delay unit 2. This will cause a pair of AND circuits 3, 4 to operate at a time that sends the select signal through to storage (FIG. 27) at a correct time. The timing of delay unit 2 is adjusted in accordance with particular considerations of any specific utilization of the invention. The AND circuits 3, 4 also respond to a signal on the LCS PROCEED line indicating that LCS requests from either the CPU or the channel are permissible. The AND circuit 3 combines a signal on the SEL TO LCS A line with a signal on the LCS A NOT BUSY line. Similarly, the AND circuit 4 combines signals on the LCS B NOT BUSY and SEL TO LCS B lines. The AND circuits 3, 4 generate the actual selection signals which will cause the operation of the related LCS, provided either that the LCS is not shared (such as LCS A in the present embodiment), or, if shared (such as LCS B), that the LCS is not busy with the other system.

The NOT BUSY signals from FIG. 26 are also applied to FIG. 29 so as to generate a signal indicating that the LCS is available *unless* it is unavailable because of a shared busy condition. Thus, in FIG. 29, an OR circuit 1 generates a signal on an LCS AVAIL IF UNSHARED line in response to either one of two AND circuits 2, 3 when there is a signal on the NOT LCS BUS BUSY line. The AND circuit 2 requires the same signals as the AND circuit 3 of FIG. 28: LCS A NOT BUSY and SEL TO LCS A; similiarly, the AND circuit 3 utilizes the same signals as the AND circuit 4 of FIG. 28; LCS B NOT BUSY and SEL TO LCS B.

The shared LCS decode also shown in FIG. 29 is a circuit which identifies to this bus control unit whether or not particular available LCS units are shared with another system. As illustrated briefly in FIG. 1, the present embodiment is taken, for example, with LCS B shared and LCS A not shared. This is accommodated in FIG. 29 by providing a jumper so as to enable a related AND circuit 5, 6 to generate signals for application to an OR circuit 7 in the event that a particular LCS is shared. As shown in FIG. 29, a jumper is connected for the AND circuit 6 so that any time the storage address decode circuit of FIG. 25 selects LCS B, the AND circuit 6 will cause the operation of OR circuit 7 so as to generate a signal on the SHARED LCS DEC line. On the other hand, selection of LCS A will *not* cause the AND circuit 5 to operate because the jumper is not connected at the input to AND circuit 5; this is because LCS A is unshared in the present example.

The outputs of FIG. 29 are both applied to FIG. 30, which includes the shared LCS operation circuitry and the LCS OP SELECT circuitry. In FIG. 30, a pair of AND circuits 1, 2 each respond to signals on the following lines: LCS PROCEED, LCS AVAIL IF UNSHARED, NOT RAW CANCEL, and AR (running A-time clock pulse). The AND circuit 1 will operate if there is a signal from the shared LCS decode of FIG. 29, and the AND circuit 2 will operate if there is no signal out of the shared LCS decode as indicated by a signal on the NOT SHARED LCS DEC line. Thus if a shared LCS is selected, the AND circuit 1 will cause the setting of a latch 3; when this happens, then an AND circuit 4 will respond to the output of the latch 3 on a SHARED LCS OP line concurrently with a SHARED ACCEPT signal so as to cause an OR circuit 5 to set a latch 6 which generates the signal on the LCS OP SEL line. Thus the latch 6 can either be set by the AND circuit 2 when an *unshared* LCS is selected, or can be set by an AND circuit 4 when a shared LCS is selected *and* the selection is accepted by the shared LCS. The output of the latch 6 on the LCS OP SEL line is a signal indicating affirmative, successful selection of an LCS unit, and as such as comparable to the positive select (POS SEL) signal generated in FIG. 13 herein which relates to the affirmative selection of one of the high speed storage devices. This is a signal used within the bus control unit to indicate to various circuits that a successful selection of an LCS unit has in fact occurred.

The latch 3 in FIG. 30 is reset by an OR circuit 7 in response to a rejection of a shared LCS request as indicated by a signal on a SHARED REJECT line, or by a system reset controlled signal on the SRC line. The OR circuit 7 is also responsive to an AND circuit 8 which permits resetting the latch 3 at B-time following the operation of the latch 6 in FIG. 30. Thus the latch 3 is set when a shared LCS is selected, and this is reset either in response to the rejection of the request, or in response to the acceptance of the request as manifested by the setting of the LCS OP SEL latch 6.

The latch 6 in FIG. 30 is reset at every A-time of the running clock, or in response to a controlled system reset as indicated by a signal on the SRC line.

A primary function of the LCS OP SEL signal is to cause the bus control unit to be busy insofar as further LCS requests are concerned until such time as the current LCS request has proceeded to a point where the next LCS request may begin to be processed. This is controlled by two different "bus busy" circuits shown in FIGS. 32 and 33. The general circuit is the LCS BUS BUSY latch 1 which is shown in FIG. 33 to be settable by an AND circuit 2 at B-time following the appearance of the signal on the LCS OP SEL line. This latch will remain on until an LCS unit reaches that stage of its operation when either data will be returned in response to a fetch request, or error signals may be returned in response to either a store or a fetch request. This is indicated by a signal on the LCS ADV line, which signal is a combination of raw advance signals from the LCS units and other signals as shown in FIG. 41 and described hereinafter. The signal on the LCS ADV line is applied to an OR circuit 3, together with the controlled system reset signal on the SRC line. A somewhat different bus busy condition is generated in FIG.

32 on the LCS SHORT BUS BUSY line by a latch 1 which is set by an AND circuit 2 at B-time in response to the signal on the LCS OP SEL line. In other words, the latches 1 in both FIGS. 32 and 33 are set in response to the same condition. However, the short bus busy latch in FIG. 32 is reset by an OR circuit 3 in response to a panel key reset signal (which is operator-controlled) on a PANEL BUS BUSY RESET line, as well as by the SRC signal, or it may be operated by an AND circuit 4. The AND circuit 4 operates at early B-time in response to a signal on the EBR line after the appearance of the sync slot signal on the SYNC SLOT line. This signal indicates that data is about to return from an LCS unit, and therefore causes the blocking of further requests by either the channels or the CPU for any high speed storage. The short bus busy is caused to go off prior to bus busy due to the fact that it takes longer for channels to begin to process LCS requests, due to the need to send signals back to the channel and to receive an answer from the channel (in accordance with the circuitry of FIGS. 17–19) prior to reaching that stage in a request where the LCS must be found to be not busy. Thus, SHORT BUS BUSY is reset sooner than BUS BUSY. The output of the LCS SHORT BUS BUSY latch in FIG. 32 is applied to an OR circuit 5 along with signals on the LCS A BUSY DEC and LCS B BUSY DEC lines, which are operated in a manner which is obvious in view of FIG. 31. Thus the OR circuit 5 will generate a signal on the SHORT BUS BUSY INH CH line when SHORT BUS BUSY is on or during the time that a busy decode for either LCS is present. This has the effect of inhibiting channel LCS requests when the selected LCS (that designated by the address circuits of FIG. 25) is busy, or when the LCS accessing portions of the bus control unit are busy with either of the LCS units.

In order to prevent any fetch requests from the CPU from being honored while the CPU is waiting for a return of data from a fetch request made to an LCS unit, a latch 1 in FIG. 34 is set by an AND circuit 2 in response to signals on an LCS OP SEL line, the P–ACC line, and the NOT STR line, all of which indicate that an LCS operation is being performed by the CPU, and since it is not a store type operation it must be a fetch. The latch 1 is reset by an OR circuit 3 in response to the controlled system reset signal on the SRC line, or in response to a timed indication of an advance from either one of the LCS units on the TIMED LCS ADV line. The CPU LCS FTCH OUTST signal, out of FIG. 34, is applied as an inhibit to any form of CPU request, in FIG. 11.

Shared accept and reject signals are synchronized in FIG. 35. In FIG. 35 a pair of OR circuits 1, 2 respectively sense the presence of ACCEPT signals from either LCS A or LCS B. These signals will be sent to a requesting BCU only in the event that the LCS unit is shared; in other cases, the bus control unit of the sole system controls accept and reject signals as described with respect to the remainder of the circuitry herein. When an "ACCEPT" signal is received at the OR circuit 1, it will cause an AND circuit 3 to set a latch 4 provided the AND circuit 3 also has a running A-clock signal on the AR line together with a signal from the off-side of a latch 5. The feedback from the latch 5 is to ensure that, no matter how long the ACCEPT signal is, that the latch 4 will only be set during the *first* A-time after the ACCEPT signal is received, and not during the second or third or subsequent A-times, due to the inhibiting effect of the output of the latch 5 as applied to the AND circuit 3. The latch 4 is reset just before being set at A-time, or in response to the controlled system reset signal on the SRC line. The output of the latch 4 is supplied to an AND circuit 6 so as to cause setting of the latch 5 at B-time following the setting of the latch 4. The latch 5 will remain set until the following B-time or until a signal is received on the SRC line. The output of the latch 5 on the SHARED ACCEPT line is utilized in FIG. 30 (described hereinbefore) to generate the LCS OP SEL signal during shared operations, and is also utilized in FIG. 40 as one of the possible ways of generating a channel accept for transmission to the channel.

Whenever the OR circuit 2 in FIG. 35 receives a REJECT signal from either LCS A or LSC B, it will cause an AND circuit 8 to set a latch 9 during A-time, provided that there is a signal from the off-side of a latch 10 which operates so as to permit the latch 9 to set only once (similarly to the relationship between the latches 4 and 5, described hereinbefore. The latch 9 will remain set until the following A-time or until a signal is received on the SCR line, due to the operation of an OR circuit 11. The output of the latch 9 is applied to an AND circuit 12 so as to cause the setting of the latch 10 at B-time; the latch 10 is reset on the following B-time or in response to a signal on the SRC line. The shared reject signal out of the latch 10 is utilized to reset the SHARED LCS OP latch (FIG. 30), as described hereinbefore.

Either shared accept or shared reject may cause the operation of an OR circuit 1 in FIG. 36 in response to corresponding AND circuits 2, 3 so as to generate a signal on the CH SHARED RST line, which causes the reset channel priority signal to be generated in FIG. 38. The AND circuits 2 and 3 in FIG. 36 will each operate only if there is also applied thereto a channel request signal and a shared LCS OP signal, indicating that the channel has requested a shared LCS unit.

In FIG. 37 is shown an OR circuit 1 which generates a companion signal to the output of FIG. 36: INH LCS CH PRI RST. This is generated by an OR circuit 1 in response to any one of four inputs, including shared LCS decode, shared LCS OP, and outputs from either of two AND circuits 2, 3. The AND circuit 2 will cause the generating of the inhibit LCS channel priority reset signal when a selection is made to LCS A, and LCS A has reached the pre-complete stage as indicated by the signal on the LCS A PRE CMPLT TGR line. The AND circuit 3 is similar for LCS B.

A signal which causes the actual resetting of the channel priority circuits is generated on a RST CH PRI line in FIG. 38 by an OR circuit 1 in response to many different conditions. As indicated by the legends in FIG. 38, the different conditions relate to different specific operating conditions within the bus control unit. Specifically, a plurality of AND circuits 2–6 are each responsive to the signal on the DLY FULL line and to a running late B-clock signal on the LBR line. The AND circuit 2 responds a late B time to and AND circuit 7 which similarly operates at LBR time when the channel has not selected an LCS but a chanel selection has been made as indicated by a signal on the GATE CH line. The AND circuit 7 generates a signal on the HSS PRI RST line which designates resetting of channel priority in response to high speed storage operations (contrasted with LSC operations). This signal is also utilized as one of the setting conditions for the channel accept circuit shown in FIG. 40 and described hereinafter. The AND circuit 2 is responsive to the signal on the CH SHARED RST line which is generated in FIG. 36 as described hereinbefore. The AND circuit 4 responds to channel requests when there is a CH LCS FLAG concurrently with the presence of SHORT BUS BUSY INH CH. The AND circuit 5 is responsive to the channel LCS OP condition whenever channel priority reset is not to be inhibited as indicated by a signal on the NOT INH LCS CH PRI RST line. The AND circuit 6 is similar to the AND circuit 5 except that it operates in response to the combination of raw cancel and not NOT LCS BUS BUSY. The OR circuit 1 is also independently operable in response to a controlled system reset signal on the SRC line. Thus the AND circuit 2 causes high speed storage reset; the AND circuit 3 causes reset during shared LCS operations; the AND circuit 4 handles the situation when the LCS is busy; automatic resetting of priority in response to successful operations occurs through the AND circuit 5; and a cancel will cause a resetting through the AND circuit 6.

In FIG. 39, the SYNC SLOT signal which prevents high speed storage accessing during that time when the bus control unit must be reserved for data returns from the LCS is generated by a latch which is set by an AND circuit 2 at B-time provided there is a PRE ADVANCE SYNC line from a latch 3. The latch 3 is set by an AND circuit 4 when ever the latch 1 is reset as indicated by a signal from the off-side of the latch 1 at late B-time provided there is output from an OR circuit 5. The OR circuit 5 responds to a (PRE ADV) signal from either one of the LCS units. This signal is the first signal to be sent from the delay line clock of FIG. 27 (within either of the LCS units) to the bus control unit. The off-side of the latch 1 is fed back to the set side of the latch 3 so as to ensure that the latch 3 will set only the first time that a PRE ADV signal corresponds with the late B running clock signal. The latch 3 is reset at the next late B-time, and the latch 1 will remain set until it receives the TIMED LCS ADV signal.

Channel accept signals are generated in FIG. 40 by a latch 1 which is set by an OR circuit 2 in response to any one of three AND circuits 3–5. The AND circuit 3 in turn is responsive to an OR circuit 6 which is fed by two AND circuits 7, 8. The AND circuits 7 and 8 each operates only when there is a signal present on the CH LCS OP line. The AND circuit 7 must also have a RAW CANCEL signal and a signal (indicating that the BCU is not busy for LCS purposes) on the NOT LCS BUS BUSY line. The AND circuit 8 is fed by a signal on the LCS AVAIL IF UNSHARED line.

The AND circuits 3, 4, and 5 each require an input on the DLY FULL and LBR lines. The AND circuit 4 is responsive to a channel request accompanied by a SHARED ACCEPT signal which is therefore a shared accept to be sent to the channel. The AND circuit 5 responds to the high speed storage channel priority reset signal generated in FIG. 38 on the HSS PRI RST line. Thus, unshared LCS, shared LCS with a SHARED ACCEPT, or high speed priority resets can cause the channel accept (CH ACC) signal to be generated by the latch 1, which is reset at the following late B-time after being set. The channel accept signal is returned to all of the channels, and the one channel which is in communication with the bus control unit will recognize the CH ACC signal for its internal use.

In FIG. 41 is shown the advance circuits which relate to the LCS. An OR circuit 1 responds to advance signals received directly from either LCS A or LCS B so as to cause an AND circuit 2 to set a latch 3 provided that a latch 4 is still reset and there is a late B running clock signal on the LBR line. The feed-back from the latch 4 to the latch 3 ensures that the latch 3 will operate only during the first late B-time when the advance signals are received. The output of the latch 3 causes an AND circuit 5 to set the latch 4 at B-time. The output of the latch 4 on the TIMED LCS ADV line is utilized to feed an OR circuit 6 so as to generate a signal on the ADV LCS line, as is also a signal on the CANCELLED LCS DUMMY ADV line. This latter line is operated by a delay unit 7 in response to the output of a latch 8 which is settable by an AND circuit 9 whenever a cancel condition is indicated by a signal on the CANCEL line. This signal appears whether a cancel is generated because of fault within the system or because a panel key fetch operation is being performed. The other input to the AND circuit 9 causes the latch 8 to be set only during LCS operations as indicated by the signal on the LCS OP SEL line. The delay unit 7 has a sufficiently long time delay characteristic so as to delay the output of the latch 8 so that the CANCELLED LCS DUMMY ADV signal can be picked up at the master timing signal of the system, which is A-time (the next quarter of a cycle following late B-time). The duration of the delay is therefore equal to about the length of the LBR signal, or roughly 50 nanoseconds.

Both the TIMED LCS ADV and the CANCELLED LCS DUMMY ADV signals are applied to an OR circuit 10 in FIG. 41 so as to permit an AND circuit 11 to set a latch 12 at late B-time following the delayed late B-time and the B-time in which these signals are originated. The output of the latch 12 is applied to an AND circuit 13 so that the following B-time will cause setting of the latch 14. This latch defines the LCS ADVANCE signal on the LCS ADV line. The output of both latches 12, 14 in FIG. 41 is applied to an OR circuit 15 so as to generate a signal indicating that data is to be controlled by LCS return addresses due to a signal on the LCS return line. This line is fed to an inverter 16 so that in all other cases there will be a signal on a HSS RETURN line. These two lines are utilized, in the alternative, in FIG. 43, wherein the particular requesting unit is identified by the two high speed storage return address registers (X, Y) and the LCS return address register (FIG. 42).

The LCS return address register shown in FIG. 42 is very similar to the X and Y return address registers shown in FIGS. 45 and 46 of said copending application. A pair of AND circuits 1, 2 in FIG. 42 determine whether a CPU LCS FETCH or a NON–CPU LCS FETCH, respectively, is being performed. This is done by monitoring the pulse accept signal on the P-ACC and NOT P-ACC lines, respectively. Both AND circuits 1, 2 require the presence of the LCS OP SEL signal which signifies the affirmative selection of an LCS unit before they will operate. The AND circuit 1 also requires that a storage protection key instruction is not being performed and that a "STORE" operation is not being performed, as indicated by signals on the NOT SET OR INSERT KEYS and NOT STR lines.

The present embodiment has not included details as to storage protection by means of keys as disclosed in said copending application. Storage protection may be made available in LCS units, as is disclosed with respect to high speed storage units in said copending application; however, additional busy significance must be utilized if one storage protection apparatus is used for both LCS units, since even though the LCS might not be busy, the storage protection monitoring equipment might be busy. Alternatively, storage protection may be provided independently for each LCS unit, in which case it would appear as described with respect to high speed storage in said copending application. The only requirement herein would be to "OR" the key information from the LCS units into key information received from high speed storage and to gate this with a key advance from the LCS unit (in a manner completely analogous with that shown in FIG. 53 for the high speed storage units in said copending application). The present embodiment ignores the keys entirely (which may be considered to be an embodiment without keys), since keys have nothing to do with the present invention.

The outputs and the AND circuits 1 and 2 are applied respectively to related sets of AND circuits 3, 4. Each of the AND circuits 3 therefore relates to a CPU LCS FETCH, and each of the AND circuits 4 relates to a NON CPU LCS FETCH. Each of the AND circuits 3, 4 is also fed by a RELEASE LCS RETURN ADDRESS REG signal which is generated by an OR circuit 5 in response to an AND circuit 6 or in response to the controlled system reset signal on the SRC line. The AND circuit 6 will operate at B-time in response to the LCS OP SEL signal. Each of the AND circuits 3 responds to a signal indicating a requesting unit (A, B, J) or to an invalid address or diagnostic fetch so as to generate signal indicating that the LCS is to return to that requesting unit either the fetched data or the indications of errors which occurred during the LCS operation. This operates in a manner identical with the return address register shown in FIGS. 45 and 46 of said copending application. Notice that the diagnostic fetch can be gated only by a CPU LCS fetch. The LCS to channel indication is generated whenever there is a non-CPU LCS fetch; this is due to the fact that even if a return is generated for a channel, if a particular channel is not involved in a storage request at the time that the return indications are being made to the channels, then there will be no channel capable of responding to this signal, so that it is immaterial that a signal is sent to the channels (such as, for instance, during a maintenance channel operation: MC RTN AB, MC RTN J). It is also notable that the non-CPU fetch requests include only maintenance channel fetch requests to either AB or J, or are channel invalid address indications which will cause the LCS-INV signal.

In FIG. 43, the advance signals are generated in a manner which is quite similar to that shown with respect to FIG. 47 of said copending application, the only difference being that an additional source of return information (the LCS units) is accounted for by providing additional paths through which the various outputs of FIG. 43 may be energized. FIG. 43 does not include AND circuits 20, 21, 23 and 24 as in FIG. 47 of said copending application because the functions of these AND circuits have been combined in AND circuits 8–11 and 12–19, for simplicity herein. The remaining reference numerals 1–25 shown in FIG. 47 of said copending application are applied to circuits in FIG. 43 herein which perform identical functions as in FIG. 47. Therefore, the differences in FIG. 43 compared to FIG. 47 of said copending application are the inclusion of LCS circuitry as follows:

The OR circuit 1 may be operated by an AND circuit 30;

The OR circuit 2 may be operated by an AND circuit 31;

The OR circuit 3 is also operated by a signal on the ADV LCS line;

The OR circuit 4 may be operated by an AND circuit 32;

The OR circuit 6 may be operated by an AND circuit 33;

And the OR circuit 7 may be operated by an AND circuit 34.

Each of the AND circuits 30, 31 are operated by LCS RETURN, whereas the AND circuits 8–11 have an additional input thereto (HSS RETURN). Similarly, the AND circuits 32–34 are operated by the ADV LCS signal. An additional OR circuit 35 is provided in FIG. 43 herein so as to permit generating a channel LCS advance signal on the CH LCS ADV line, which is separate and apart from the high speed storage channel advance signal out of the OR circuit 5 on the CH ADV line. This is because the time delays inherent in the interfacing with the channels require the separation of a channel advance from a high speed storage advance inasmuch as there is a possibility of an overlapping of advance signals relating to an underlapped high speed storage for one channel and an overlapped LCS request for a different channel.

LCS check circuits shown in FIG. 44 are LCS versions of the high speed storage check circuits shown in FIGS. 49 and 50 of said copending application, and the bottom of FIG. 44 provides the combination of the check signals for high speed storage (from FIGS. 49 and 50 of said copending application) with the channel LCS check signals generated in FIG. 44.

In FIG. 44, a signal is generated on the LCS CPU ADR CHK line by a latch 1 which is settable by an OR circuit 2 in response to any one of three AND circuits 3–5. The AND circuit 3 recognizes a storage address bus address check signal which concurs with pulse accept (indicating CPU operation) and the LCS OP SEL signal. The AND circuit 3 operates at B-time in response to the B running clock signal on the BR line. The AND circuit 4 responds to an address check from LCS A concurrently with LCS A advance signal and a signal indicating that a CPU LCS operation is involved, on the NOT LCS–CH line. The AND circuit 5 similarly responds to an address check from LCS B together with an LCS B advance signal. The latch 1 is reset by the check reset signal on the CHK RST line. This signal indicates that an error condition has been recognized and that log-out procedure has begun, as described in said copending application. A signal is generated on an LCS CPU DATA CHECK line by a latch 6 in response to an AND circuit 7 which may be set by an OR circuit 8 whenever there is a data check from either LCS A or LCS B. The AND circuit 7 also has, as inputs thereto, signals indicating that none of the other LCS outputs of FIG. 42 are available so that the LCS–INV signal must be the only signal being generated in FIG. 42. This is done negatively with respect to AND circuit 7 so as to provide a greater assurance that the error manifestation does relate to the CPU in this particular instance. Also, a store operation is not remembered this late in a cycle, so the absence of a fetch is used to recognize a store. The latch 6 is also reset by the CHK RST signal. A latch 9 generates a channel LCS address check signal when set by an OR circuit 10 in response to any one of the three AND circuits 11–13. The AND circuits 11–13 are identical to the AND circuits 3–5 except that the AND circuit 11 responds to a signal on the NOT P–ACC line indicating a channel rather than a CPU operation, and the AND circuits 12 and 13 respond to the signal on the LCS–CH line, indicating channel rather than CPU operation. The latch 9 is reset by an AND circuit 14 in response to the LCS OP SEL at B-time of a NON CPU operation, as indicated by the signal on the NON P–ACC line. The output of the latch 9 is applied to an AND circuit 15 so that, when gated by a signal on the CH LCS ADV line, it will supply an input to an OR circuit 16 which is also responsive to the channel storage address check signal generated in FIG. 50 of so copending application on the CH STG ADR CHK line. This generates a similarly-named signal (CH STG ADR CHK) which is sent back to the channel indicating that the storage unit has detected an address error in response to a channel operation which may be either with respect to LCS or high speed storage; the signal generated in FIG. 50 of said copending application relates only to high speed storage. An OR circuit 17 is similar in function to the OR circuit 16, in that it not only permits recognizing a channel storage data check generated in FIG. 49 of said copending application which relates only to high speed storage, but also permits recognizing data checks from LCS A or LCS B so as to generate a channel storage data check signal for application to the channel. As is described with respect to FIG. 49 in said copending application, any data check which is received at the bus control unit may be passed along to a channel indicating a channel storage data check even though the channel is not then responsive to an advance signal for a request which it has made. This is due to the fact that, if a channel is not expecting an advance signal, then no channel will be responsive to the simple channel storage data check and storage address check signals sent out to the channel at that time.

The outputs of FIG. 44, together with other outputs from circuits shown in said copending applications, are applied to the BCU stop-clock circuitry of FIG. 45. Specifically, FIG. 45 herein is identical to FIG. 52 of said copending application with the exception of the fact that the OR circuit 1 is also responsive to LCS CPU address checks and LCS CPU data checks as generated by the latches 1 and 6 in FIG. 44 herein. In all other respects, FIG. 45 herein is identical to FIG. 52 of said copending application.

The storage bus out latch (SBOL) shown in FIG. 46 herein is completely analogous to the SBOL shown in FIG. 54 of said copending application, with the exception of the fact that each of the latches 1–5 shown in FIG. 54 of said copending application has two additional setting conditions, each relating to one of the LCS units herein. The AND circuits 6–10 of FIG. 54 of said copending application are eliminated in FIG. 46 herein by combining the functions thereof with the other AND circuits 16–18 and in the corresponding AND circuits relating to the LCS in FIG. 46. Otherwise, circuits 11–18 of FIG. 54 of said copending application perform the same functions as similarly-numbered circuits herein, the circuitry relating to latches 3, 4 and OR circuits 13, 14 being eliminated herein for simplicity due to the increased complexity with the LCS inputs added thereto.

The storage bus out latch circuit of FIG. 46 is straightforward, using SBO ADV (which is generated in response to *any* storage advance in FIG. 43) to gate any of the AND circuits which may cause the OR circuits 11–15 to set the latches 1–5. Additionally, each AND circuit has, as an input thereto, one of the bits of the SBO (storage bus out, the bus which contains the data leaving storage for application to either the CPU, the maintenance-channel, or the channels) with a data out gate (DOG) from the corresponding storage device. Thus, a data out gate from LCS A is combined in an AND circuit 30 in FIG. 46 with bit 0 of the storage bus out from LCS A; a data out gate from LCS B is combined in an AND circuit 31 with bit 0 from the storage bus out of LCS B, etc. In other words, the storage bus out latch 46 combines a data out gate (or the panel key fetch manifestation) with the corresponding bit for each of the 64 bits and the 8 parity bits which may be received from a storage (or from the panel keys).

Having completed the elementary detailed description of modifications to be made in a bus control unit as illustrated in said copending application, and of LCS control circuits to be utilized so as to convert the bus control unit of said copending application into a shared LCS, overlapped/underlapped accessing system, a summary of operation of the circuitry follows.

Whenever a request come in from either a channel or the CPU, it will be combined with high order address bits from the channel or CPU (respectively) so as to determine if an LCS operation is being requested. If it is, then either the channel or the LCS request may be manifested in the request latch, and this will cause the setting of the LCS PROCEED line (FIG. 24). When LCS PROCEED is available, if there is a non-busy LCS and no cancel is involved, and if the LCS is not shared, or a shared LCS is accepted, then the affirmative selection of an LCS will be indicated by the LCS OP SEL line. It is to be noted that busy-ness is compared against the actual address as decoded in the storage address decode circuits shown in FIG. 25. These addresses are applied by the storage address bus which is gated from either the channel of the CPU in response only to channel and CPU requests, without regard to whether or not the selected LCS is busy or unavailable. Thus decoding can take place even though the ultimate decoding may show that the LCS is itself busy, or the LCS is shared and the request must wait for an "ACCEPT" signal before the request may proceed through the remainder of the circuitry.

Various special conditions are accounted for so as to permit LCS operations even within the definition of the operating system given with respect to said copending application. For instance, since the CPU must receive its data in the order in which it is requested, the CPU LSC FETCH OUTSTANDING (FIG. 34) prevents further CPU requests when it is set, so as to allow time for the slow LCS to respond. Similarly, channel requests are prevented from being manifested if the shared LCS OP line is up, indicating that a shared LCS has been signaled but that the "ACCEPT" from the LCS (or "REJECT" therefrom) has not yet returned from the shared LCS. This prevents tying up the channels unnecessarily for unavailable shared LCS units.

By separating LCS BUS BUSY and LCS SHORT BUS BUSY, the different request processing times for the CPU and the channels are accounted for, so as to permit maximum back-to-back fetching from LCS by either channels or CPU.

Although the invention has been shown and described with respect to a preferred embodiment thereof, it should be understood by those skilled in the art that various changes and omissions in the form and detail thereof may be made therein without departing from the spirit and the scope of the invention, which is to be limited only as set forth in the following claims.

What is claimed is:

1. In a data-processing system including data utilizing apparatus and having bulk storage apparatus and high-speed storage apparatus, the response speed of said high-speed storage apparatus being at least twice as fast as said bulk storage apparatus, an overlapped/underlapped accessing control, comprising:
   a storage bus control unit including storage request manifesting means capable of manifesting storage operation requests selectively related to said high speed storage or to said bulk storage;
   independent high-speed storage selection means and bulk storage selection means, each responsive to respective manifestations from said storage request manifesting means; and
   inhibit means responsive directly to the operating cycle of said bulk storage apparatus for inhibiting the operation of said high-speed storage selection means.

2. The invention described in claim 1 additionally comprising:
   storage data transfer means for transferring manifestations of data from either of said storage apparati to said data utilizing apparatus; and wherein
   said inhibit means is comprised of circuitry within said bulk storage apparatus, whereby said bulk storage apparatus can itself inhibit said high speed storage apparatus from utilizing said storage data transfer means and thereby prevent said high speed storage apparatus from interfering with the operation of said bulk storage apparatus.

3. The invention described in claim 1, additionally comprising:
   means responsive to a data fetch request manifestation relating to said bulk storage apparatus for blocking the manifestations of a fetch request relating to said high-speed storage apparatus.

4. A data processing system comprising.
   a plurality of input/output devices;
   a central processing unit;
   a storage bus control unit;
   a high speed storage device;
   a bulk storage device having a cycle time at least twice as long as the cycle time and said high speed storage device;
   a plurality of storage access request means, one relating to said input/output devices and one relating to said central processing unit; each capable of manifesting requests of the fetch type or of the store type, alternatively;
   a plurality of storage selection means, one for said high speed storage and one for said bulk storage, each responsive to related ones of said storage access request means;
   fetch control means responsive to a data fetch request relating to said central processing unit effective to operate the selection means relating to said bulk storage to block any further requests relating to said central processing unit, said fetch control means not effective in response to high speed storage requests of either type or bulk storage requests of the store type or to input/output device requests of either type, said fetch control means not effective to block input/output device requests.

5. Data processing apparatus comprising:

a plurality of data processing systems, each having a high speed storage device;

a shared bulk storage device arranged for data communication with each of said systems, said bulk storage having an operating cycle time which is greater than the operating cycle time of said high speed storage devices;

a storage bus control for each system, each having storage selection means for selecting from among said bulk storage and the related high speed storage, each of said storage bus controls capable of interspersing selections of related high speed storage with selections of said bulk storage; and sync slot means controlled by said bulk storage and selectively effective upon one of said storage bus controls, at a time related to the completion of the operating cycle of said bulk storage, for preventing the one of said storage bus controls which selected bulk storage for said operating cycle from interspersing further high speed storage selections.

6. The invention described in claim 5 additionally comprising:

data communication means in each of said bus control units for transferring data manifestations between portions of the related system and either of the related high speed storage or said bulk storage, selectively;

cycle control means in said bulk storage for generating a pre-advance manifestation just prior to a time when data manifestations are to be transferred from said bulk storage through a selection one of said bus control units; and wherein said sync slot means are each responsive to said preadvance means so as to selectively block the storage selection means of the related storage bus control.

7. Data processing apparatus comprising:

a plurality of data processing systems, each having a high speed storage device;

a shared bulk storage device arranged for data communication with each of said systems, said bulk storage having an operating cycle time which is greater than the operating cycle time of said high speed storage devices;

a storage bus control for each system, each having storage selection means for selecting from among said bulk storage and the related high speed storage, each of said storage but controls capable of interspersing selections of related high speed storage with selections of said bulk storage; and availability means in said bulk storage responsive to the basic operation cycle thereof to manifest availability, or lack thereof, alternatively, of said bulk storage;

accept and reject manifesting means in said bulk storage responsive to said availability means to communicate either an accept manifestation or a reject manifestation to a selecting bus control unit, alternatively;

means in each storage bus control responsive to said selection means for blocking further selections by the related storage bus control; and means in each storage bus control responsive to said accept manifestation to permit further selections to high speed storage and responsive to said reject manifestation to permit further selections to either storage.

8. Data processing apparatus comprising:

a plurality of data processing systems, each having a high speed storage device;

a shared bulk storage device arranged for data communication with each of said systems, said bulk storage having an operating cycle time which is greater than the operating cycle time of said high speed storage devices;

a storage bus control for each system, each having storage selection means for selecting from among said bulk storage and the related high speed storage, each of said storage bus controls capable of interspersing selections of related high speed storage with selections of said bulk storage; and availability means in said bulk storage responsive to the basic operation cycle thereof to manifest availability, or lack thereof, alternatively, of said bulk storage;

accept and reject manifesting means in said bulk storage responsive to said availability means to communicate either an accept manifestation or a reject manifestation to a selecting bus control unit, alternatively;

means in each storage bus control responsive to said selection means for blocking further selections by the related storage bus control; and an unshared bulk storage arranged for data communication with only one of said systems, said unshared bulk storage having all of the facilities of the first named shared bulk storage;

shared storage decode means in each of said storage bus controls, each for generating a shared manifestation when a bulk storage request relates to said shared bulk storage; and bulk select means in each storage bus control alternatively responsive to the lack of a related shared manifestation or to the concurrent presence of said related shared manifestation with a related accept manifestation to indicate, to the related storage bus control, a successful selection of one of said bulk storages.

9. The invention described in claim 8 wherein:

said shared storage decode means each includes a bistable means to manifest to said bulk select means the fact that the related selection appertains to said unshared bulk storage; and additionally comprising means responsive to a related reject manifestation for resetting said bistable means.

10. Data processing apparatus comprising:

a plurality of data processing systems, each having a corresponding high speed storage device, each including a storage bus control;

a shared bulk storage in data communication with at least two of said systems;

an unshared bulk storage in data communication with only one of said systems;

means in each bus control for accessing the related ones of said high speed storages and bulk storages on an underlapping basis;

and means in said bulk storage for blocking the accessing by a selected storage bus control of a related high speed storage.

References Cited

UNITED STATES PATENTS

| | | | |
|---|---|---|---|
| 3,333,251 | 7/1967 | Brenza et al. | 340—172.5 |
| 3,302,183 | 1/1967 | Bennett et al. | 340—172.5 |
| 3,292,151 | 12/1966 | Barnes et al. | 340—172.5 |
| 3,248,708 | 4/1966 | Haynes | 340—172.5 |
| 3,242,467 | 3/1966 | Lamy | 340—172.5 |
| 3,231,862 | 1/1966 | Blosk et al. | 340—172.5 |

GARETH D. SHAW, *Primary Examiner.*